US011218038B2

(12) United States Patent
Hunstable

(10) Patent No.: US 11,218,038 B2
(45) Date of Patent: Jan. 4, 2022

(54) CONTROL SYSTEM FOR AN ELECTRIC MOTOR/GENERATOR

(71) Applicant: Linear Labs, LLC, Granbury, TX (US)

(72) Inventor: Fred E. Hunstable, Granbury, TX (US)

(73) Assignee: Linear Labs, Inc., Fort Worth, TX (US)

( * ) Notice: Subject to any disclaimer, the term of this patent is extended or adjusted under 35 U.S.C. 154(b) by 0 days.

(21) Appl. No.: 16/385,344

(22) Filed: Apr. 16, 2019

(65) Prior Publication Data

US 2019/0356251 A1 Nov. 21, 2019

Related U.S. Application Data

(63) Continuation of application No. 14/866,788, filed on Sep. 25, 2015, now Pat. No. 10,263,480, which is a continuation-in-part of application No. 14/608,232, filed on Jan. 29, 2015, now abandoned, and a continuation-in-part of application No. 13/848,048, filed on Mar. 20, 2013, now Pat. No. 9,419,483.

(60) Provisional application No. 62/056,389, filed on Sep. 26, 2014, provisional application No. 62/055,612, filed on Sep. 25, 2014, provisional application No. 62/055,615, filed on Sep. 25, 2014, provisional application No. 61/613,022, filed on Mar. 20, 2012.

(51) Int. Cl.
| H02K 1/27 | (2006.01) |
| H02P 13/06 | (2006.01) |
| H02P 25/18 | (2006.01) |
| H02K 21/12 | (2006.01) |
| H02P 6/17 | (2016.01) |
| H02P 6/18 | (2016.01) |

(52) U.S. Cl.
CPC ............... *H02K 1/27* (2013.01); *H02K 21/12* (2013.01); *H02P 6/17* (2016.02); *H02P 6/183* (2013.01); *H02P 13/06* (2013.01); *H02P 25/18* (2013.01); *H02P 2207/05* (2013.01)

(58) Field of Classification Search
CPC .......... H02K 1/27; H02K 21/12; H02P 13/06; H02P 25/18
See application file for complete search history.

(56) References Cited

U.S. PATENT DOCUMENTS

| 2,703,370 A | 3/1955 | Steensen |
| 3,300,663 A | 1/1967 | Rosaen |
| 3,469,133 A | 9/1969 | Stcherbatcheff |

(Continued)

FOREIGN PATENT DOCUMENTS

| AU | 2013235132 B2 | 7/2017 |
| CA | 2881979 C | 4/2021 |

(Continued)

OTHER PUBLICATIONS

CN Office Action, dated Sep. 12, 2019, by the CIPO, re Patent App No. 201680033171.1.

(Continued)

*Primary Examiner* — Bickey Dhakal
(74) *Attorney, Agent, or Firm* — Bill R. Naifeh

(57) ABSTRACT

Disclosed are various embodiments for a control system for motor/generator comprising: a controller configured to receive sensor input related to rotation of a plurality of coils relative to a throat of a partial toroidal magnetic cylinder, and energize the coils based on the sensor input.

20 Claims, 23 Drawing Sheets

(56) References Cited

U.S. PATENT DOCUMENTS

| | | |
|---|---|---|
| 3,895,245 A | 7/1975 | Bode |
| 3,973,137 A | 8/1976 | Drobina |
| 3,979,619 A | 9/1976 | Whiteley |
| 4,237,396 A | 12/1980 | Blenkinsop |
| 4,371,801 A | 2/1983 | Richter |
| 4,388,547 A | 6/1983 | Gruber |
| 4,441,043 A | 4/1984 | DeCesare |
| 4,488,075 A | 12/1984 | DeCesare |
| 4,538,086 A | 8/1985 | Marsh |
| 4,547,713 A | 10/1985 | Langley et al. |
| 4,629,921 A | 12/1986 | Gavaletz |
| 4,739,201 A | 4/1988 | Brigham et al. |
| 4,814,651 A | 3/1989 | Elris |
| 5,004,944 A | 4/1991 | Fisher |
| 5,099,158 A | 3/1992 | Stuart et al. |
| 5,245,238 A | 9/1993 | Lynch et al. |
| 5,594,289 A | 1/1997 | Minato |
| 5,691,589 A | 11/1997 | Keim et al. |
| 5,821,710 A | 10/1998 | Masuzawa |
| 5,825,113 A | 10/1998 | Lipo |
| 5,886,450 A | 2/1999 | Kuehnle |
| 5,962,947 A | 10/1999 | Suzuki et al. |
| 5,977,684 A | 11/1999 | Lin |
| 6,054,834 A | 4/2000 | Ha |
| 6,093,986 A | 7/2000 | Windhorn |
| 6,104,108 A | 8/2000 | Hazelton |
| 6,163,091 A | 12/2000 | Wasson et al. |
| 6,211,597 B1 | 4/2001 | Nakano |
| 6,388,352 B1 | 5/2002 | Huang |
| 6,462,430 B1 | 10/2002 | Joong |
| 6,531,799 B1 | 3/2003 | Miller |
| 6,664,689 B2 | 12/2003 | Rose |
| 6,664,704 B2 | 12/2003 | Calley |
| 6,774,591 B2 | 8/2004 | Arimitsu et al. |
| 6,803,691 B2 | 10/2004 | Rose |
| 6,806,607 B2 | 10/2004 | Lau |
| 6,891,299 B2 | 5/2005 | Coupart |
| 6,924,574 B2 | 8/2005 | Qu et al. |
| 6,924,579 B2 | 8/2005 | Calley |
| 6,930,421 B2 | 8/2005 | Rose |
| 6,930,422 B2 | 8/2005 | Rose |
| 6,967,424 B2 | 11/2005 | Popov |
| 6,975,055 B2 | 12/2005 | Joong et al. |
| 6,979,925 B2 | 12/2005 | Schwamm |
| 6,994,238 B2 | 2/2006 | Estabaya |
| 6,998,757 B2 | 2/2006 | Seguchi et al. |
| 7,049,722 B2 | 5/2006 | Rose |
| 7,233,088 B2 | 6/2007 | Wise |
| 7,279,818 B1 | 10/2007 | Wise |
| 7,315,103 B2 | 1/2008 | Qu |
| 7,348,703 B2 | 3/2008 | Bojiuc |
| 7,378,749 B2 | 5/2008 | Moore |
| 7,554,241 B2 | 6/2009 | Rao |
| 7,576,465 B2 | 8/2009 | Bremner |
| 7,732,973 B2 | 6/2010 | Bojiuc |
| 7,755,244 B2 | 7/2010 | Ley |
| 7,765,905 B2 | 8/2010 | Trumper |
| 7,791,242 B2 | 9/2010 | Bojiuc |
| 7,834,503 B2 | 11/2010 | Bojiue |
| 7,898,134 B1 | 3/2011 | Shaw |
| 8,008,821 B2 | 8/2011 | Calley |
| 8,063,528 B2 | 11/2011 | Toot |
| 8,074,922 B2 | 12/2011 | Bojiuc |
| 8,159,104 B1 | 4/2012 | Bojiuc |
| 8,232,695 B2 | 7/2012 | Bojiuc |
| 8,288,916 B2 | 10/2012 | Quere |
| 8,362,731 B2 | 1/2013 | Smith |
| 8,400,037 B2 | 3/2013 | Wojtowicz |
| 8,415,848 B2 | 4/2013 | Calley |
| 8,598,754 B2 | 12/2013 | Lacour |
| 8,816,554 B2 | 8/2014 | Li |
| 8,847,464 B2 | 9/2014 | Qu et al. |
| 8,912,699 B2 | 12/2014 | Kuntz |
| 9,219,962 B2 | 12/2015 | Hunstable |
| 9,287,745 B2 * | 3/2016 | Akatsu ............... H02K 3/20 |
| 9,419,483 B2 | 8/2016 | Hunstable |
| RE46,449 E | 6/2017 | Bojiuc |
| 9,729,016 B1 | 8/2017 | Hunstable |
| 9,825,496 B2 | 11/2017 | Hunstable |
| 9,876,407 B2 | 1/2018 | Walsh |
| 10,125,814 B2 | 11/2018 | Walsh |
| 10,256,680 B2 | 4/2019 | Hunstable |
| 10,263,480 B2 | 4/2019 | Hunstable |
| 10,284,029 B2 | 5/2019 | Hunstable |
| 10,326,343 B2 | 6/2019 | Walsh |
| 10,340,768 B2 | 7/2019 | Walsh |
| 10,439,452 B2 | 10/2019 | Hunstable |
| 10,447,103 B2 | 10/2019 | Hunstable |
| 10,476,362 B2 | 11/2019 | Hunstable |
| 11,018,536 B2 | 5/2021 | Igwemezie |
| 2003/0025417 A1 | 2/2003 | Rose |
| 2004/0027022 A1 | 2/2004 | Weir |
| 2004/0061397 A1 | 4/2004 | Rose |
| 2004/0194286 A1 | 10/2004 | Rose |
| 2004/0195932 A1 | 10/2004 | Rose |
| 2004/0195933 A1 | 10/2004 | Rose |
| 2004/0232800 A1 | 11/2004 | Seguchi et al. |
| 2005/0194855 A1 | 9/2005 | Hasebe |
| 2006/0038454 A1 | 2/2006 | Bojiuc |
| 2006/0055272 A1 | 3/2006 | Lee et al. |
| 2006/0273686 A1 | 12/2006 | Edelson et al. |
| 2007/0228860 A1 | 10/2007 | Rao |
| 2008/0278019 A1 | 11/2008 | Lu et al. |
| 2009/0102305 A1 | 4/2009 | Lu |
| 2009/0195090 A1 | 8/2009 | Rittenhouse |
| 2009/0224627 A1 | 9/2009 | Hino et al. |
| 2009/0224628 A1 | 9/2009 | Hiwaki et al. |
| 2009/0261675 A1 | 10/2009 | Hsiao et al. |
| 2010/0164422 A1 | 7/2010 | Shu et al. |
| 2010/0289365 A1 | 11/2010 | Bando et al. |
| 2011/0187222 A1 | 8/2011 | Li et al. |
| 2011/0309708 A1 | 12/2011 | Van Neste |
| 2012/0153763 A1 | 6/2012 | Kenji |
| 2012/0286616 A1 | 11/2012 | Li |
| 2013/0249343 A1 | 9/2013 | Hunstable |
| 2013/0334902 A1 | 12/2013 | Oiwa et al. |
| 2013/0334937 A1 | 12/2013 | Yamada et al. |
| 2014/0062236 A1 | 3/2014 | Taniguchi et al. |
| 2014/0070651 A1 | 3/2014 | Gerfast |
| 2014/0191612 A1 | 7/2014 | Mariotto |
| 2015/0001976 A1 | 1/2015 | Hunstable |
| 2015/0137647 A1 | 5/2015 | Hunstable |
| 2015/0171694 A1 | 6/2015 | Walsh |
| 2016/0020652 A1 | 1/2016 | Hunstable |
| 2016/0094096 A1 | 3/2016 | Hunstable |
| 2016/0380496 A1 | 12/2016 | Hunstable |
| 2017/0163115 A1 | 6/2017 | Gotz |
| 2017/0222494 A1 | 8/2017 | Hunstable |
| 2017/0237325 A1 | 8/2017 | Hunstable |
| 2018/0131244 A1 | 5/2018 | Hunstable |
| 2018/0212486 A1 | 7/2018 | Hunstable |
| 2018/0219464 A1 | 8/2018 | Newmark et al. |
| 2018/0278134 A1 | 9/2018 | Hunstable |
| 2018/0331593 A1 | 11/2018 | Hunstable |
| 2019/0103793 A1 | 4/2019 | Walsh |
| 2019/0199185 A1 | 6/2019 | Hunstable |
| 2019/0229563 A1 | 7/2019 | Hunstable |
| 2019/0260243 A1 | 8/2019 | Hunstable |
| 2019/0312497 A1 | 10/2019 | Walsh |
| 2020/0007016 A1 | 1/2020 | Hunstable |
| 2020/0083759 A1 | 3/2020 | Hunstable |
| 2020/0112212 A1 | 4/2020 | Hunstable |
| 2021/0066984 A1 | 3/2021 | Hunstable et al. |
| 2021/0067016 A1 | 3/2021 | Hunstable et al. |

FOREIGN PATENT DOCUMENTS

| | | |
|---|---|---|
| CN | 2226352 Y | 5/1996 |
| CN | 2452204 Y | 10/2001 |
| CN | 101005229 A | 7/2007 |
| CN | 101212150 B | 5/2011 |
| CN | 102687378 A | 9/2012 |
| CN | 102761179 A | 10/2012 |
| CN | 102761211 A | 10/2012 |

(56) References Cited

FOREIGN PATENT DOCUMENTS

| | | |
|---|---|---|
| CN | 102792569 A | 11/2012 |
| CN | 103683768 A | 3/2014 |
| CN | 104272559 A | 1/2015 |
| CN | 104285366 A | 1/2015 |
| CN | 104285366 B | 10/2017 |
| CN | 107710569 A | 2/2018 |
| CN | 109891726 A | 6/2019 |
| CN | 107925328 B | 6/2020 |
| CN | 109891726 B | 3/2021 |
| DE | 102010024344 A1 | 12/2011 |
| EP | 3729663 B1 | 12/2001 |
| EP | 1191673 A2 | 3/2002 |
| EP | 1990894 A2 | 11/2008 |
| EP | 2828962 B1 | 5/2021 |
| JP | S51133709 | 11/1976 |
| JP | S5492305 | 12/1977 |
| JP | S58116050 A | 7/1983 |
| JP | S61173658 A | 8/1986 |
| JP | S61144782 | 9/1986 |
| JP | 2002-254268 A | 9/2002 |
| JP | 2002369473 A | 12/2002 |
| JP | 2006217771 A | 8/2006 |
| JP | 2008-043127 A | 2/2008 |
| JP | 2008141853 A | 6/2008 |
| JP | 2010166741 A | 7/2010 |
| JP | 2010-226937 A | 10/2010 |
| JP | 2015-177646 A | 10/2015 |
| JP | 6223418 B2 | 10/2017 |
| JP | 2019-527022 A | 9/2019 |
| KR | 1020070092089 A | 7/2008 |
| KR | 1020090033866 A | 2/2010 |
| KR | 101276633 B1 | 6/2013 |
| KR | 10-2048601 B1 | 11/2019 |
| KR | 10-2150817 | 8/2020 |
| WO | 2008/006906 A1 | 1/2008 |
| WO | 2008096913 A1 | 8/2008 |
| WO | 2011032675 A2 | 3/2011 |
| WO | 2014188737 A1 | 11/2014 |
| WO | 2016014717 A1 | 1/2016 |
| WO | 2016164818 A1 | 10/2016 |
| WO | 2017003955 A1 | 1/2017 |
| WO | 2017070403 A1 | 4/2017 |
| WO | 2018045360 A1 | 3/2018 |
| WO | 2020150536 A1 | 7/2020 |

OTHER PUBLICATIONS

BR Office Action, dated Dec. 3, 2019, by the Brazil Patent Office, re BR Patent App No. BR112014023183-4.
EP Official Action, dated Dec. 10, 2019, by the EPO, re EP Patent App No. 16858253.4.
Notice of Allowance, dated Jan. 8, 2020, by the USPTO, re U.S. Appl. No. 15/813,360.
Aydin, Metin, et al., "Design and 3D Electromagnetic Field Anaylsis of Non-slotted and Slotted TORUS Type Axial Flux Surface Mounted Permanent Magnet Disc Machines," IEEE International Electric Machines and Drives conference, Jun. 17-20, 2001, pp. 645-651.
Aydin, Metin, et al., "Performance Evaluation of an Axial Flux Consequent Pole PM Motor using Finite Element Analysis," IEEE International Electric Machines and Drives Conference, vol. 3, Jun. 1-4, 2003, pp. 1682-1687.
Huang, Surong, et al., "TORUS Concept Machines: Pre-Prototyping Design Assessment for Two Major Topologies," IEEE Industry Applications Conference, vol. 3, Sep. 30-Oct. 4, 2001, pp. 1619-1625.
Japanese Office Action, dated Jan. 25, 2017, re JP Patent App No. 2015-501894.
International Search Report and Written Opinion of the ISA, dated Aug. 8, 2014, re PCT/US2013/033198.
International Search Report and Written Opinion of the ISA, dated Aug. 18, 2016, re PCT/US2016/026776.
International Search Report and Written Opinion, dated Nov. 3, 2016, by the ISA/RU, re PCT/US2016/039673.
International Search Report and Written Opinion, dated Jan. 9, 2017, by the ISA/US, re PCT/US2016/057999.
International Search Report and Written Opinion, dated Mar. 15, 2018, by the ISA/RU, re PCT/US2017/049981.
Office Action, dated Jun. 27, 2018, by the USPTO, re U.S. Appl. No. 15/008,431.
Notice of Allowance, dated Mar. 6, 2019, by the USPTO, re U.S. Appl. No. 15/008,431.
Notice of Allowance, dated Jun. 24, 2019, by the USPTO, re U.S. Appl. No. 15/008,431.
Office Action, dated Jul. 21, 2017, by the USPTO, re U.S. Appl. No. 15/413,228.
Final Office Action, dated Mar. 9, 2018, by the USPTO, re U.S. Appl. No. 15/413,228.
Office Action, dated Sep. 19, 2018, by the USPTO, re U.S. Appl. No. 15/413,228.
Notice of Allowance, dated Apr. 10, 2019, by the USPTO, re U.S. Appl. No. 15/413,228.
Office Action, dated Jun. 27, 2019, by the USPTO, re U.S. Appl. No. 15/813,360.
EP Exam Report, dated Apr. 18, 2018, by the EPO, re EP App No. 13714168.5.
EP Exam Report, dated Oct. 10, 2018, by the EPO, re EP App No. 13714168.5.
EP Search Report, dated Oct. 26, 2018, re EP Patent App No. 16777421.5.
EP Official Action, dated Nov. 13, 2018, by the EPO, re EP App No. 16777421.5.
EP Extended Search Report, dated Feb. 22, 2019, by the EPO, re EP App No. 16818559.3.
EP Office Action, dated Mar. 12, 2019, by the EPO, re EP App No. 16818559.3.
Extended EP Search Report, dated Apr. 18, 2019, by the EPO, re EP App No. 16858253.4.
EP Official Action, dated May 8, 2019, by the EPO, re EP Patent App No. 16858253.4.
CA Office Action, dated Jan. 24, 2019, by the CIPO, re CA App No. 2,881,979.
Chinese Office Action, dated Apr. 10, 2019, by the CIPO, re CN App No. 201680033171.1.
Indian Exam Report, dated Nov. 19, 2018, by IP India, re IN App No. 8335/DELNP/2014.
Office Action, dated Feb. 25, 2019, by the USPTO, re U.S. Appl. No. 15/848,540.
Notice of Allowance, dated Jun. 12, 2019, by the USPTO, re U.S. Appl. No. 15/848,540.
Notice of Allowance, dated May 31, 2019, by the USPTO, re U.S. Appl. No. 16/374,132.
CN Office Action, dated Jun. 5, 2019, by the CIPO, re CN Patent App No. 201680050018.X.
CN Office Action, dated Jul. 9, 2019, by the CIPO, re Patent App No. 201680061215.1.
KR Office Action, dated Jun. 7, 2019, by KIPO, re KR Patent App No. 10-2014-7029089.
EP Exam Report, dated Aug. 9, 2019, by the EPO, re EP Patent App No. 13714168.5.
DA Office Action, dated Jan. 8, 2020, by the CIPO re CA App No. 2,881,979.
EP Official Action, dated Jan. 29, 2020, by the EPO, re EP Patent App No. 16777421.5.
KR Office Action, dated Feb. 3, 2020, by the KIPO, re KR App No. 10-2019-7033838.
AU Office Action, dated Feb. 26, 2020, by IP Australia, re AU App No. 201634225.
EP Extended Search Report, dated Mar. 17, 2020, by the EPO, re EP App No. 17847669.3.
Office Action, dated Apr. 16, 2020, by the USPTO, re U.S. Appl. No. 16/506,137.
Office Action, dated Apr. 15, 2020, by the USPTO, re U.S. Appl. No. 16/601,529.

(56) References Cited

OTHER PUBLICATIONS

International Search Report, dated Apr. 16, 2020, by the ISA/RU, re PCT/US2020/013966.
Written Opinion, dated Apr. 16, 2020, by the ISA/RU, re PCT/US2020/013966.
EP Exam Report, dated Apr. 17, 2020, by the EPO, re EP App No. 16818559.3.
CN 2nd Office Action, dated May 29, 2020, by the CIPO, re CN App No. 201680061215.1.
Notice of Allowance, dated May 20, 2020, by the USPTO, re U.S. Appl. No. 15/813,360.
EP Exam Report, dated Jun. 9, 2020, by the EPO, re EP App No. 13714168.5.
IN Exam Report, dated Jul. 6, 2020, by the India Patent Office, re IN App No. 201817013288.
Notice of Allowance, dated Jul. 23, 2020, by the USPTO, re U.S. Appl. No. 16/601,529.
EP Official Action, dated Apr. 4, 2020, by the EPO, re EP App No. 17847669.3.
CN Office Action, dated Sep. 2, 2020, by the CIPO, re CN App No. 201780054222.3.
Office Action-Restriction, dated Sep. 4, 2020, by the USPTO, re U.S. Appl. No. 16/293,515.
BR Exam Report, dated Aug. 25, 2020, by the BPO, re BR App No. BR112018007810-7.
EP Communication pursuant to Article 94(3) EPC, dated Oct. 14, 2020, by the EPO, re EP App No. 16858253.4.
EP Exam Report, dated Oct. 15, 2020, by the EPO, re EP App No. 16818559.3.
Office Action, dated Aug. 4, 2020, by the USPTO, re U.S. Appl. No. 16/404,631.
Final Office Action, dated Oct. 30, 2020, by the USPTO, re U.S. Appl. No. 16/506,137.
Office Action, dated Oct. 30, 2020, by the USPTO, re U.S. Appl. No. 15/977,120.
Notice of Allowance, dated Nov. 12, 2020, by the USPTO, re U.S. Appl. No. 16/601,529.
JP Office Action, dated Oct. 15, 2020, by JPO, re JP App No. 2018-540691.
Office Action, dated Nov. 25, 2020, by the USPTO, re U.S. Appl. No. 16/566,132.
Notice of Allowance, dated Nov. 25, 2020, by the USPTO, re U.S. Appl. No. 16/404,631.
Notice of Allowance, dated Dec. 10, 2020, by the USPTO, re U.S. Appl. No. 16/293,515.
Office Action, dated Feb. 22, 2021, by the USPTO, re U.S. Appl. No. 16/506,137.
Notice of Allowance, dated Mar. 3, 2021, by the USPTO, re U.S. Appl. No. 16/601,529.
Notice of Allowance, dated Mar. 24, 2021, by the USPTO, re U.S. Appl. No. 16/404,631.
Notice of Allowance, dated Mar. 26, 2021, by the USPTO, re U.S. Appl. No. 15/977,120.
International Search Report and Written Opinion, dated Feb. 4, 2021, by the ISA/US, re PCT/US2020/048054.
Notice of Allowance, dated May 6, 2021, by the USPTO, re U.S. Appl. No. 15/813,360.
IN Exam Report, dated May 14, 2021, by the India Patent Office, re IN App No. 2019/17006820.
Final Office Action, dated Jun. 18, 2021, by the USPTO, re U.S. Appl. No. 16/506,137.
Notice of Allowance, dated Jun. 23, 2021, by the USPTO, re U.S. Appl. No. 15/977,120.
Notice of Allowance, dated Jun. 23, 2021, by the USPTO, re U.S. Appl. No. 16/601,529.
Notice of Allowance, dated Jul. 9, 2021, by the USPTO, re U.S. Appl. No. 16/404,631.
Notice of Allowance, dated Aug. 18, 2021, by the USPTO, re U.S. Appl. No. 16/293,515.
JP Office Action, dated Jul. 8, 2021, re JP Patent App No. 2019-512779.

* cited by examiner

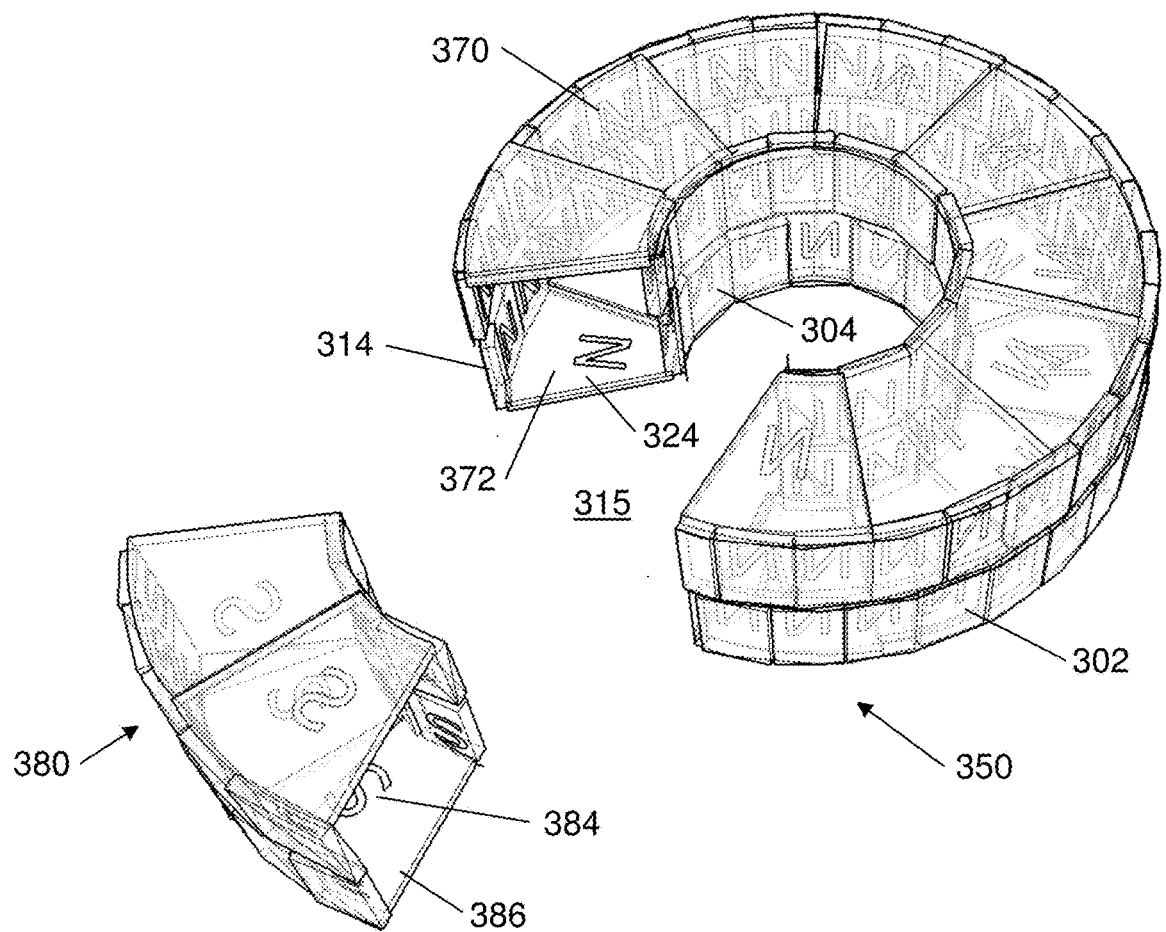
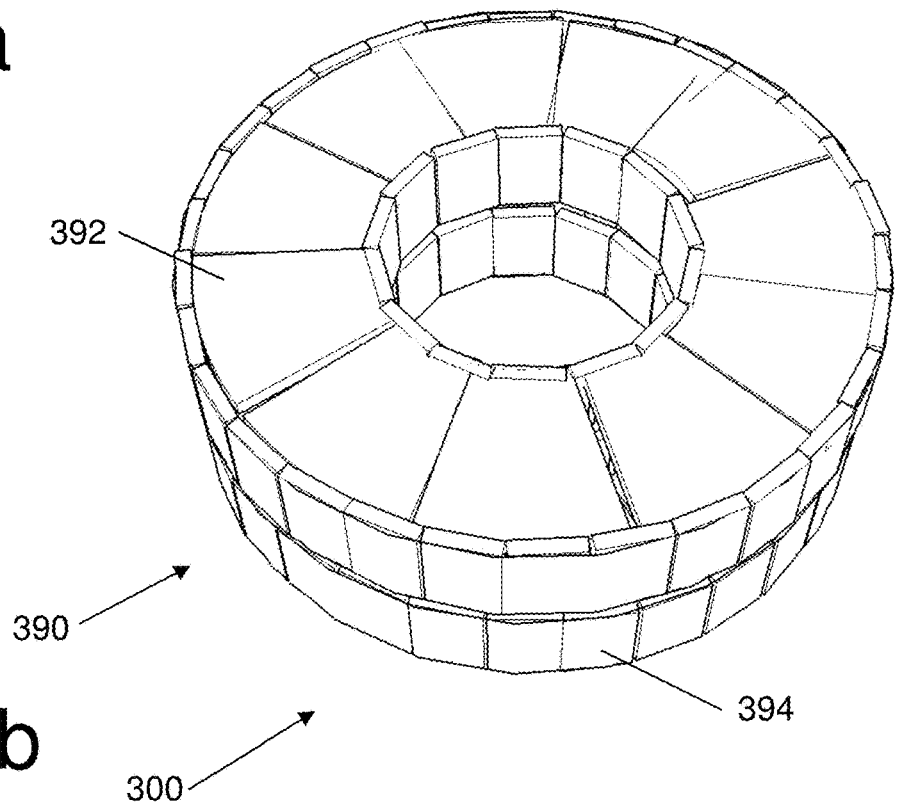
Fig. 3a
Fig. 3b

CONTROL SYSTEM FOR AN ELECTRIC MOTOR/GENERATOR

RELATED APPLICATIONS

This application is a continuation of U.S. patent application Ser. No. 14/866,788, entitled "An Improved Brushless Electric Motor/Generator," filed on Sep. 25, 2015, which is a continuation-in-part of U.S. patent application Ser. No. 14/608,232, entitled "An Improved Brushless Electric Motor/Generator," filed on Jan. 29, 2015, which also claims the benefit of the filing date of U.S. Provisional Patent Application No. 62/055,615, entitled "An Improved DC Electric Motor/Generator with Enhanced Permanent Magnetic Flux Densities," filed on Sep. 25, 2014, U.S. Provisional Patent Application No. 62/055,612, entitled "An Improved DC Electric Motor/Generator with Enhanced Permanent Magnetic Flux Densities," filed on Sep. 25, 2014, and U.S. Provisional Patent Application No. 62/056,389, entitled "An Improved DC Electric Motor/Generator with Enhanced Permanent Magnetic Flux Densities," filed on Sep. 26, 2014. Said U.S. patent application Ser. No. 14/866, 788 is also a continuation-in-part of U.S. patent application Ser. No. 13/848,048, entitled "An Improved DC Electric Motor/Generator with Enhanced Permanent Magnetic Flux Densities" filed on Mar. 20, 2013, which claims the benefit of U.S. Provisional Application No. 61/613,022, entitled "An Improved Electric Motor/Generator," filed on Mar. 20, 2012. The disclosures of all of the above applications are hereby incorporated by reference for all purposes.

TECHNICAL FIELD

The invention relates in general to a new and improved electric motor/generator, and in particular to an improved system and method for controlling rotary motion from an electromagnetic motor or controlling the generation of electrical power from a rotary motion input.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

A magnetic field is generated when electric charge carriers such as electrons move through space or within an electrical conductor. The geometric shapes of the magnetic flux lines produced by moving charge carriers (electric current) are similar to the shapes of the flux lines in an electrostatic field. Magnetic flux passes through most metals with little or no effect, with certain exceptions, notably iron and nickel. These two metals, and alloys and mixtures containing them, are known as ferromagnetic materials because they concentrate magnetic lines of flux. Areas of greatest field strength or flux concentration are known as magnetic poles.

In a traditional electric motor, a central core of tightly wrapped current carrying material creates magnetic poles (known as the rotor) which spins or rotates at high speed between the fixed poles of a magnet (known as the stator) when an electric current is applied. The central core is typically coupled to a shaft which will also rotate with the rotor. The shaft may be used to drive gears and wheels in a rotary machine and/or convert rotational motion into motion in a straight line.

Generators are usually based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Current power generation devices such as rotary alternator/generators and linear alternators rely on Faraday's discovery to produce power. In fact, rotary generators are essentially very large quantities of wire spinning around the inside of very large magnets. In this situation, the coils of wire are called the armature because they are moving with respect to the stationary magnets (which are called the stators). Typically, the moving component is called the armature and the stationary components are called the stator or stators.

Motors and generators used today produce or utilize a sinusoidal time varying voltage. This waveform is inherent to the operation of these devices.

In most conventional motors, both linear and rotating, enough power of the proper polarity must be pulsed at the right time to supply an opposing (or attracting) force at each pole segment to produce a particular torque. In conventional motors at any given instant only a portion of the coil pole pieces is actively supplying torque.

With conventional motors a pulsed electrical current of sufficient magnitude must be applied to produce a given torque/horsepower. Horsepower output and efficiency then is a function of design, electrical input power plus losses.

With conventional generators, an electrical current is produced when the rotor is rotated. The power generated is a function of flux strength, conductor size, number of pole pieces and speed in RPM. However output is a sinusoidal output which inherently has losses similar to that of conventional electric motors.

Specifically, the pulsed time varying magnetic fields produces undesired effects and losses, i.e. iron hysteresis losses, counter-EMF, inductive kickback, eddy currents, inrush currents, torque ripple, heat losses, cogging, brush losses, high wear in brushed designs, commutation losses and magnetic buffeting of permanent magnets. In many instances, complex controllers are used in place of mechanical commutation to address some of these effects.

Additionally, in motors or generators, some form of energy drives the rotation and/or movement of the rotor. As energy becomes more scarce and expensive, what is needed are more efficient motors and generators to reduce energy consumption, and hence costs.

SUMMARY

In response to these and other problems, there is presented various embodiments disclosed in this application, including methods and systems of increasing flux density by permanent magnet manipulation. Disclosed are various embodiments for a control system for a motor/generator comprising: a controller configured to receive sensor input related to rotation of a plurality of coils relative to a throat of a partial toroidal magnetic cylinder, and energize the coils based on the sensor input.

These and other features, and advantages, will be more clearly understood from the following detailed description taken in conjunction with the accompanying drawings.

It is important to note the drawings are not intended to represent the only aspect of the invention.

BRIEF DESCRIPTION OF THE DRAWINGS

FIGS. 3a through 3f are conceptualized views of a rotor or rotor assembly and various components.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding conventional control circuitry, power supplies, or circuitry used to power certain components or elements described herein are omitted, as such details are within the skills of persons of ordinary skill in the relevant art.

When directions, such as upper, lower, top, bottom, clockwise, or counter-clockwise are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Most motors and generators used today require or produce a sinusoidal time varying voltage referred to as Alternating Current (AC). When Direct Current is utilized it must first be inverted and pulsed to replicate an AC waveform to produce the desired current or mechanical output. Certain embodiments of the present invention neither produces nor utilizes AC but instead directly produces or utilizes a non sinusoidal Direct Current without the need for rectification or commutation. This results in the elimination of AC losses and results in a more efficient utilization of input or output power. However, certain aspects of the invention may accept any rectified AC current and thus may be "blind" to input power supply phasing. Thus, simple rectified single phase, two phase, three phase power, etc. are all acceptable for input power depending on the configuration.

Figure 1:
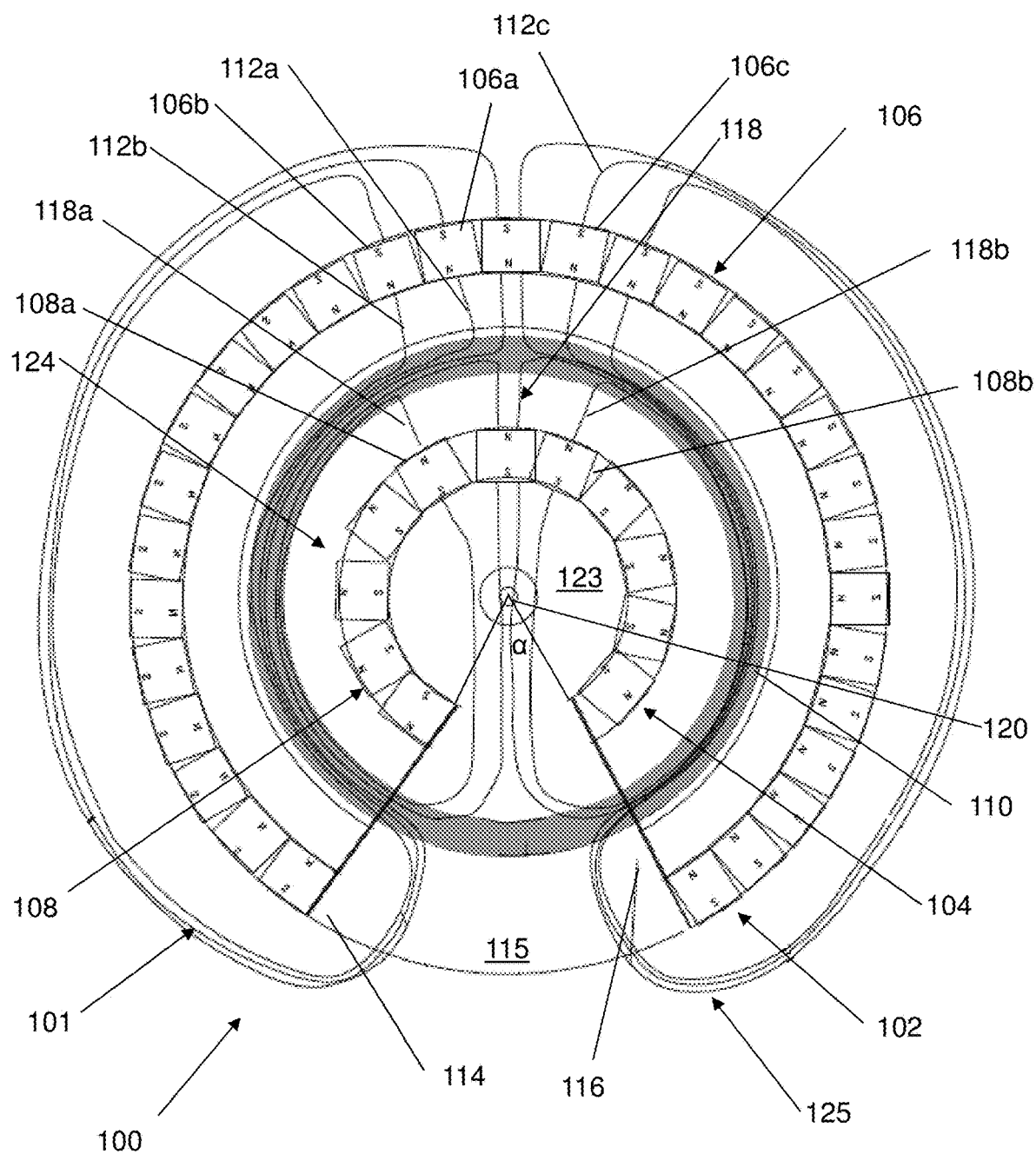
FIG. 1 is a cross-sectional view of a toroidal magnetic cylinder illustrating representative "planar" portions of magnetic flux paths within and around the cylinder with an iron core.

Turning now to FIG. 1, there is a cross-sectional view of one embodiment of a partial toroidal magnetic cylinder 100 illustrating representative planar magnetic flux paths 101 (illustrating magnetic forces) within and around the partial cylinder. These are representative illustrations; actual flux paths are dependent on the material design and specific configuration of the magnets within the cylinder. In certain embodiments, the partial magnetic cylinder 100 comprises an outer cylinder wall 102 and an inner cylinder wall 104. The outer cylinder wall 102 and inner cylinder wall 104 may be made with a plurality of magnets. In a lateral section view, such as illustrated in FIG. 1, it can be seen that the outer cylinder wall 102 is comprised of a plurality of magnets 106, comprising individual magnets, such as magnets 106a, 106b, 106c, etc. Similarly, the inner cylinder wall 104 may be comprised with a plurality of magnets 108, comprising individual magnets 108a, 108b, etc. It should be noted that only one polarity of the magnets are utilized within (or facing into) the magnetic cylinder or magnet assembly. For instance in the illustrative embodiment of FIG. 1, the north poles of the magnets 106 are each pointing radially towards a center or longitudinal axis 120 (which is coming out of the page in FIG. 1). On the other hand, the north poles of the magnets 108 each point radially away from the center 120 and towards an interior cavity 124 of the partial toroidal magnetic cylinder 100.

In certain embodiments, there may be a central core, such as an iron core 110, where a portion of the iron core 110 is positioned in the interior cavity 124 between the outer wall 102 and the inner wall 104. Although the iron core 110 is used in this embodiment as a magnetic flux line concentrator, other core materials maybe used when design considerations such as strength, reduction of eddy currents, cooling channels, etc. are considered. In fact, certain embodiments may not use the central iron core 110.

In certain embodiments, the magnets of the plurality of magnets 106 and magnets 108 may be made of out any suitable magnetic material, such as: neodymium, Alnico alloys, ceramic permanent magnets, or electromagnets. The exact number of magnets or electromagnets will be dependent on the required magnetic field strength or mechanical configuration. The illustrated embodiment is only one way of arranging the magnets, based on certain commercially available magnets. Other arrangements are possible, especially if magnets are manufactured for this specific purpose. One such exemplary embodiment is illustrated with respect to FIGS. 3a-3e.

In the embodiment illustrated in FIG. 1, the partial toroidal magnetic cylinder 100 has two open ends 114 and 116. Thus, an open magnetic space or throat 115 is formed between the open end 114 and the open end 116. As will be explained later, when the partial toroidal magnetic cylinder 100 is used as a rotor, the open magnetic area 115 may include weights to balance the rotor as it turns around the longitudinal axis 120. In yet other embodiments, the weights may be a plurality of filler magnets positioned such that they have magnetic poles which are opposite of the magnetic poles of the magnets forming the partial toroidal magnetic cylinder.

When the plurality of magnets 106 and 108 are arranged into the outer wall 102 and inner wall 104 to form the cylinder 100, the flux lines 101 will form particular patterns as represented in a conceptual manner by the flux lines illustrated in FIG. 1. The actual shape, direction, and orientation of the flux lines 101 depend on factors such as the use of an interior retaining ring, material composition and configuration. For example, the flux line 112a from the magnet 106a of the exterior wall 102 tends to flow from the north pole of the magnet in a perpendicular manner from the face of the magnet into and through the interior cavity 124 of the cylinder 100, through the iron core 110, exiting through the open end 114 into the open area 115, then flow around the exterior of the partial toroidal cylinder 100, and back to an exterior face of the magnet 106a containing its south pole.

Similarly, the flux line 112b from the magnet 106b of the exterior wall 102 tends to flow from the north pole of the magnet in a perpendicular manner from the face of the magnet into and through the interior cavity 124 of the cylinder 100, through the iron core 110, exiting through the open end 114 into the open space 115, then flow around the exterior of the cylinder 100, and back to the face of the magnet 106b containing its south pole. Although only a few flux lines 112 are illustrated for purposes of clarity, each successive magnet in the plurality of magnets will produce similar flux lines. Thus, the magnetic flux forces for each successive magnet in the plurality of magnets 106 tend to follow these illustrative flux lines or patterns 112 for each successive magnetic disc in the plurality of magnets 106 until the magnets at the open ends 114 or 116 of the magnetic cylinder 100 are reached.

Magnets on the opposing side of the cylinder 100, such as magnet 106c tend to generate flux lines 112c from the magnet 106c on the exterior wall 102 which tends to flow from the north pole of the magnet in a perpendicular manner from the face into and through the interior cavity 124 of the cylinder 100, through the iron core 110, exiting through the open end 116 into the open space 115, then flow around the exterior of the cylinder 100, and back to an exterior face of the magnet 106c containing its south pole. Although only a few flux lines 112 on the opposing side of the cylinder 100 are illustrated for purposes of clarity, each successive magnet in the plurality of magnets will produce similar flux lines. As discussed above, in yet other embodiments, the iron core 110 is not necessary. In embodiments without an iron core, the flux lines will generally flow in a similar manner, but may not be as concentrated as embodiments with an iron core. As discussed above, in certain embodiments, the iron core may act as a flux concentrator.

In certain embodiments, the interior magnetic wall 104 also produces flux forces, which may be illustrated by flux lines, such as exemplary flux lines 118. For instance, the flux line 118a from the magnet 108a on the interior wall 104 tends to flow from the north pole in a perpendicular manner from the face of the magnet, into and through the interior cavity 124 of the cylinder 100, through the iron core 110, out the open end 114 and into the open space 115, then back through the center space 123 formed by the interior wall 104 to the face of the magnet 108a containing its south pole.

Similarly, the flux line 118b from the magnet 108b on the interior wall 104 tends to flow from the north pole in a perpendicular manner from the face of the magnet, into and through the interior 124, around the interior wall 104 through the iron core 110, out the open end 116 and into the open space 115, then back through the center space 123 formed by the interior wall 104, then back to the face of the magnet 108b containing its south pole.

The magnetic flux forces for each successive magnet in the plurality of magnets 108 tend to follow these illustrative flux lines or patterns 118 for each successive magnet in the plurality of magnets 108 until the open ends 114 or 116 of the magnetic cylinder 100 are reached. Thus, the flux forces produced by the magnets of the interior wall 104 of the partial cylinder 100 have an unobstructed path to exit through one of the open ends of the cylinder and return to its opposing pole on the exterior or interior of the cylinder.

In some embodiments, the magnetic flux lines 112 and 118 will tend to develop a stacking effect and the configuration of the exterior magnetic cylinder manipulates the flux lines 101 of the magnets in the magnetic cylinder 100 such that most or all of the flux lines 110 flows out of the open ends 114 and 116 of the cylinder 100.

In conventional configurations, the opposing poles of the magnets are usually aligned longitudinally. Thus, the field flux lines will "hug" or closely follow the surface of the magnets. So, when using conventional power generating/utilization equipment, the clearances must usually be extremely tight in order to be able to act on these lines of force. By aligning like magnetic poles radially with respect to the center 120 of the partial cylinder 100, the magnetic flux lines 112 and 118 tend to stack up as they pass through the center of the magnetic cylinder 110 and radiate perpendicularly from the surface of the magnets. This configuration allows for greater tolerances between coils and the magnetic cylinder 100.

In certain embodiments, the iron core 110 is positioned concentrically about the center 120 of the magnetic cylinder 100 such that the iron core is equidistant radially from the interior wall 104, generating a representative flux pattern 101 as illustrated in FIG. 1. The flux fields or lines are drawn to the iron core 110 and are compressed or concentrated as they approach the iron core. The flux fields may then establish what can be visualized as a series of "flux walls" surrounding the iron core which extend throughout the partial cylinder 100 and the exit open ends 114 and 116. Collectively, the partial toroidal magnetic cylinder 100 generates a partially circular magnetic field 125 which is the cumulation of individual flux fields from each magnet. Correspondingly, there will be a throat or an open area 115 generally defined by the area between the open ends 114 and 116 with the angle α. In FIG. 1, the angle α between the open face 114 of the partial magnetic cylinder 110 and the open face 116 is illustrated in FIG. 1 to be approximately 60 degrees. In other embodiments, the angle α may be between 180 degrees to approaching 0 degrees. Obviously, when the angle is at 180 degrees the open area 115 is larger. When the angle approaches zero, the open area 114 is much smaller. The angle α cannot be zero, however, or the magnetic field 125 would collapse upon itself.

As discussed above, FIG. 1 is a two dimensional section view cut at an angle which is transverse to the longitudinal axis 120 (or center axis). In addition to the cylindrical walls 102 and 104, there may also be side walls which are not shown in FIG. 1. The side walls join the exterior cylindrical wall 102 to the interior cylindrical wall 104. In certain embodiments, the side walls may be made of a plurality of side wall magnets which contribute to the cumulative magnetic field 125.

Figure 2A:
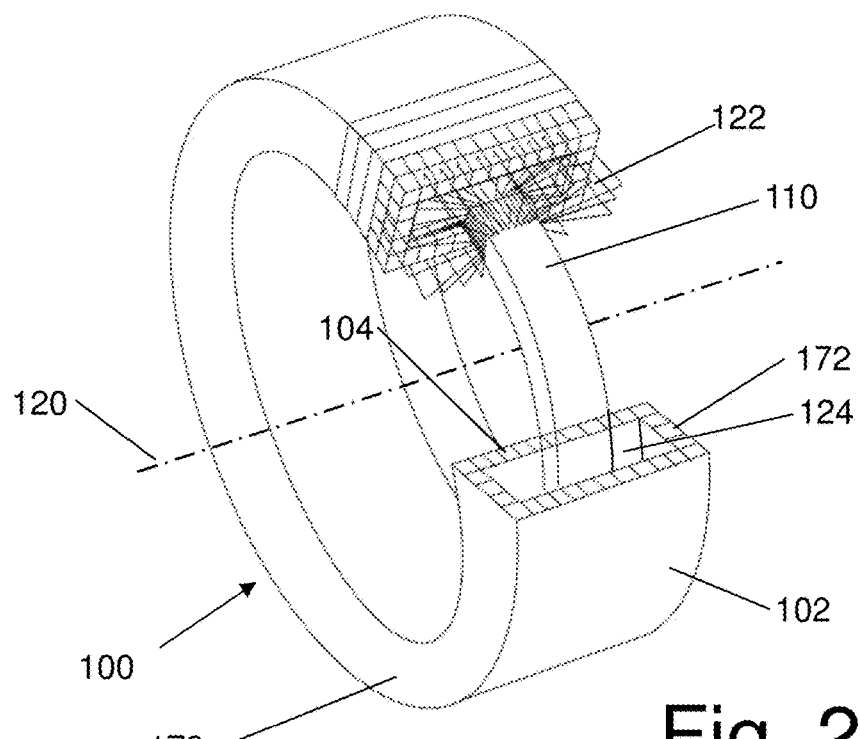
FIG. 2a is an isometric and partial section view of a toroidal magnetic cylinder of FIG. 1.

Turning now to FIG. 2a, there is presented is a conceptual isometric view of the toroidal magnetic cylinder 100 having the central iron core 110 partially positioned within the interior cavity or tunnel 124 of the partial toroidal magnetic cylinder. As illustrated in FIG. 2a, there is the exterior cylindrical wall 102, the interior cylindrical wall 104, a side wall 170, and an opposing side wall 172. In embodiments where the side wall 170 and side wall 172 are formed from a plurality of magnets, each magnet in the plurality of magnets have a common magnetic pole with cylindrical walls 102 and 104 which also face the interior cavity 124. In other embodiments, which will be discussed later, the side wall magnets may be a plurality of wedge shaped magnets specifically sized to form the side walls.

In the embodiment illustrated in FIG. 1, the common or "like" magnetic pole (i.e., the north pole) of each magnet of the magnetic cylindrical walls 102 and 104 each point radially towards the interior cavity 124 of the partial toroidal cylinder 100. Similarly, each magnet in the side walls 170 and 172 would also have their north poles facing the interior cavity 124.

Thus, the magnets forming the side walls 170 and 172 also produce flux forces represented by flux lines. The flux line from the magnets of the side walls 170 and 172 tends to flow from the north pole interior facing pole of the magnetic in a perpendicular manner, into the interior cavity 124 of the partial cylinder 100, through the iron core 110, out either the open end 114 or the open end 116 and into the open space 115, then back around the relevant side wall to south pole on the face of the originating magnet of the side wall. Thus, the side wall magnets also contribute to the flux field 125 (FIG. 1) generated by the magnets forming the cylinder walls 102 and 104.

Figure 2B:
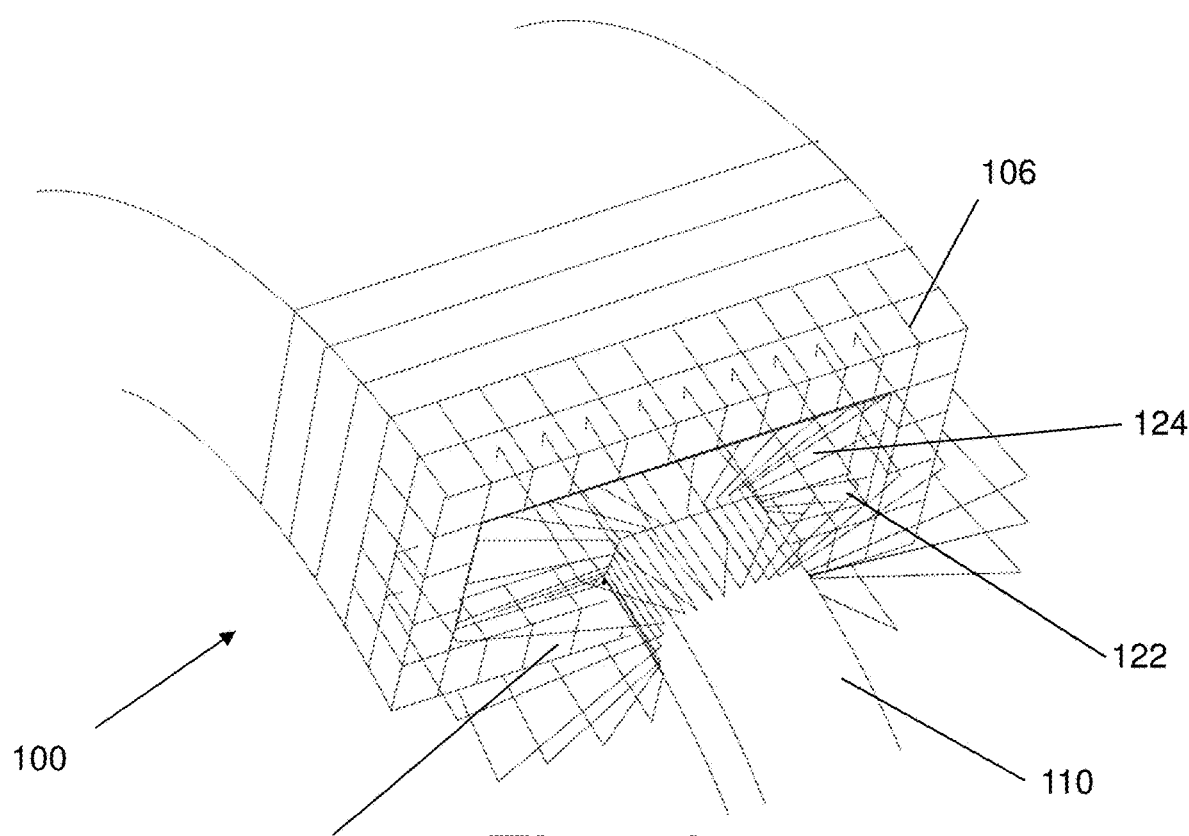
FIG. 2b is a detailed partial isometric section view of the toroidal magnetic cylinder of FIG. 1a illustrating the planar magnetic fields or flux walls generated within the cylinder interior.

FIG. 2b is a detailed partial view of the partial toroidal magnetic cylinder 100 illustrating the planar magnetic fields or "flux walls" 122 generated within the interior cavity 124 of the partial magnetic cylinder 100 in conjunction with the iron core 110. These are representative illustrations; the actual flux walls 122 or flux fields are dependent on the material design and configuration.

The partial magnetic cylinder 100 as presented in FIGS. 1, 2a and 2b have been conceptualized to illustrate the basic flux lines or paths of a partial magnetic cylinder with an iron core concentrically located in a hollow portion of its walls. From a practical perspective, a core or rotor assembly may position the core 110 within the magnetic cylinder 100. In yet other embodiments, the partial magnetic cylinder 100 may be a rotor rotating around a fixed stator.

Figure 3C:
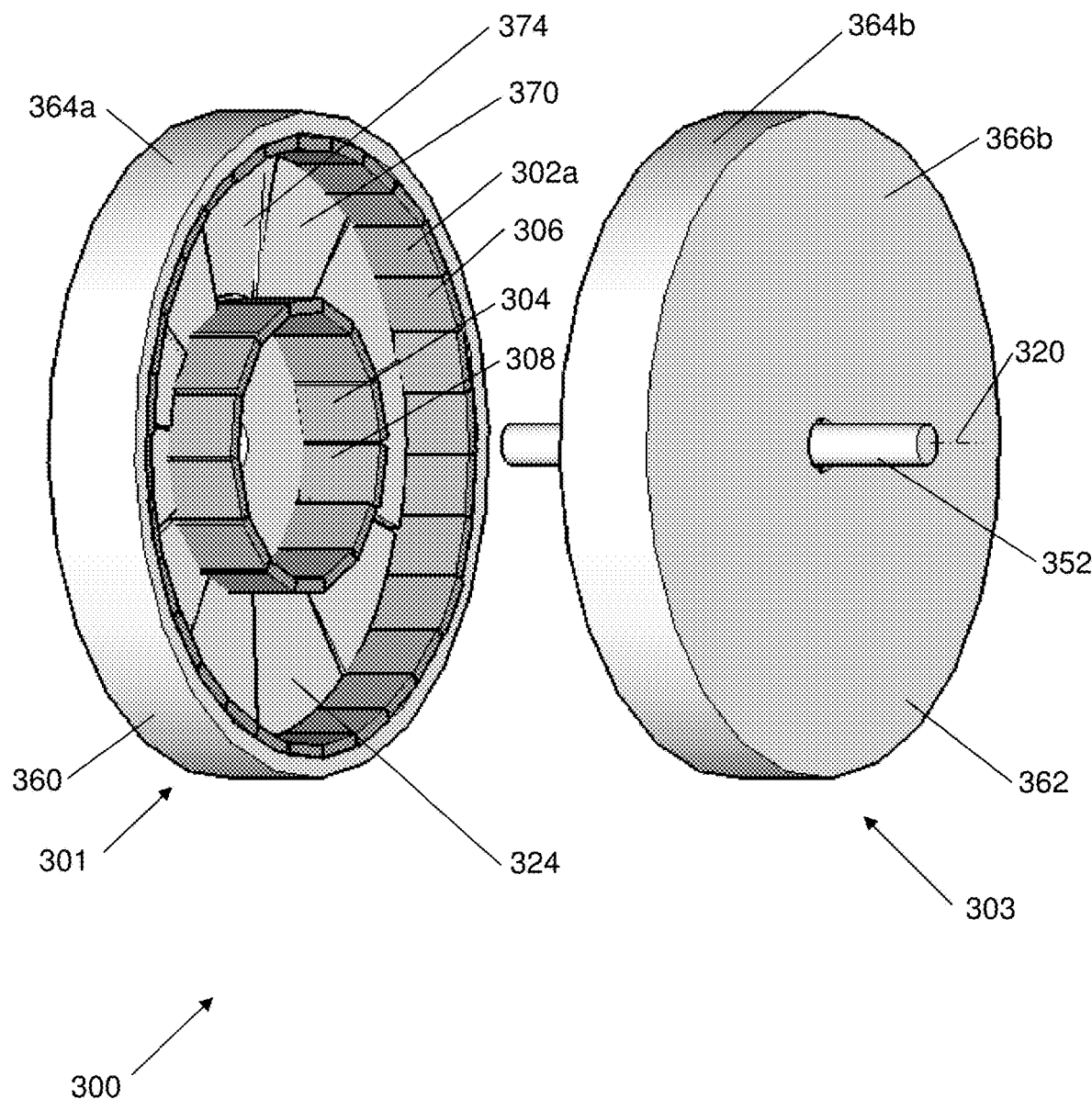
Figure 3D:
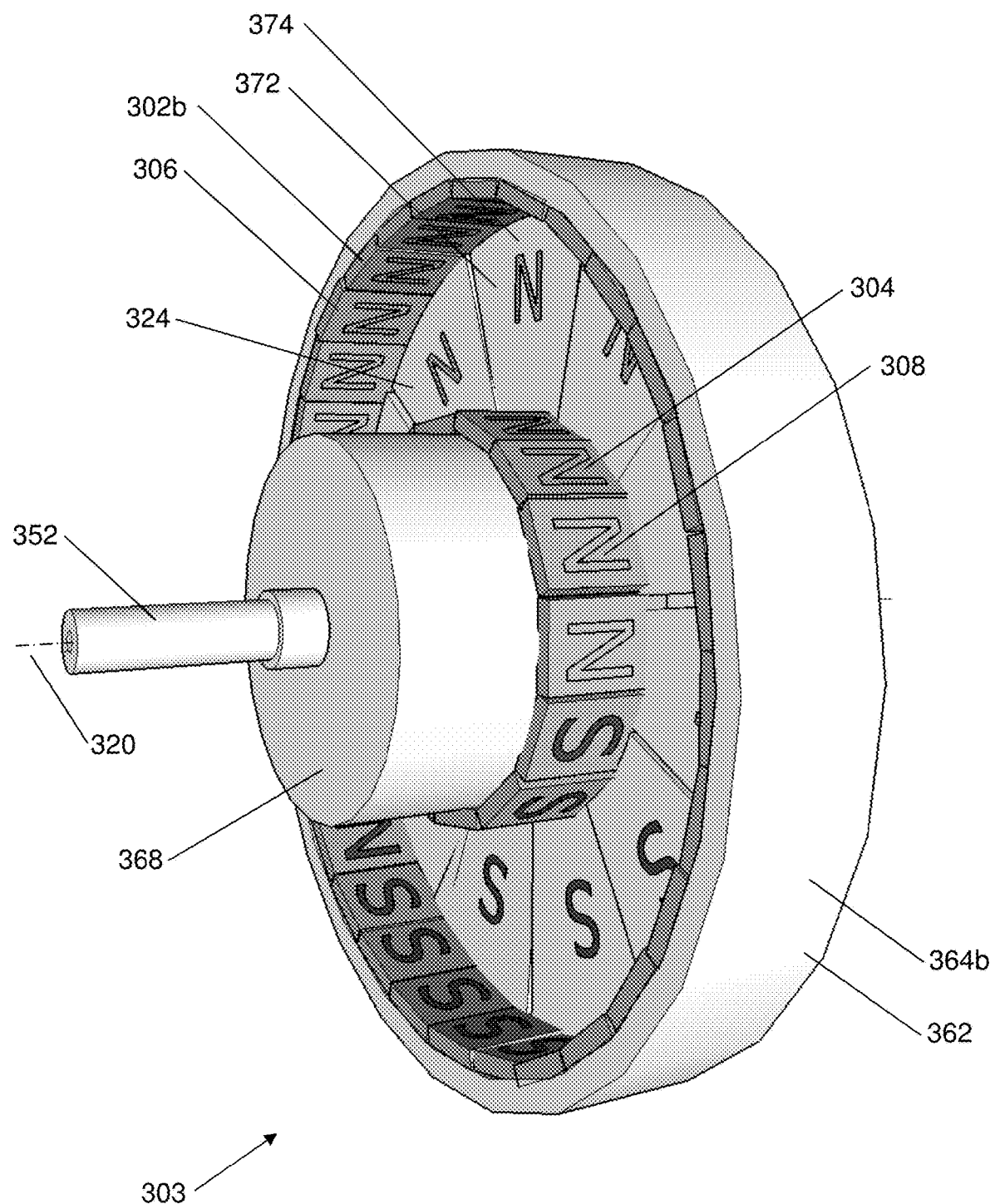
Figure 3E:
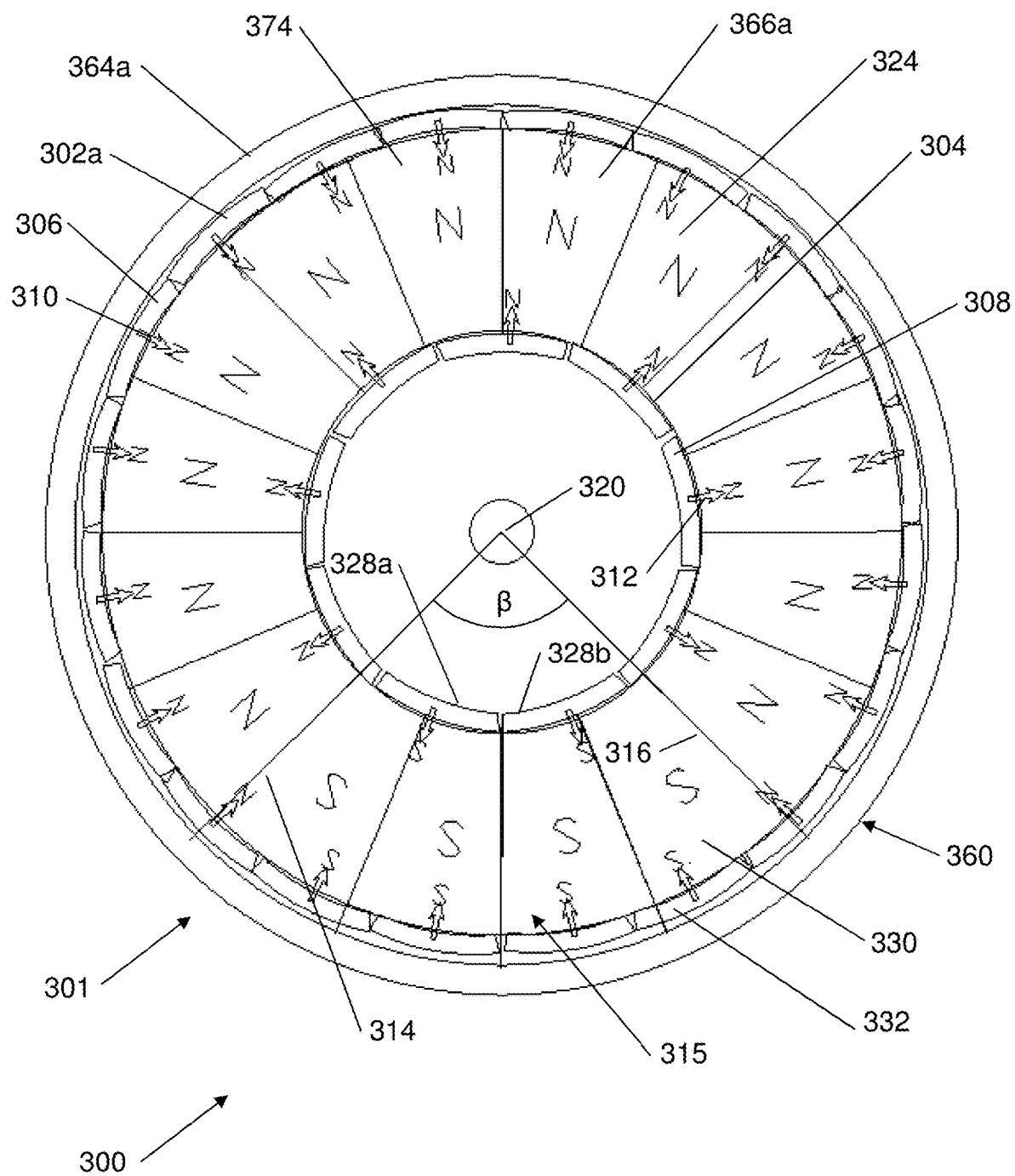
Figure 3F:
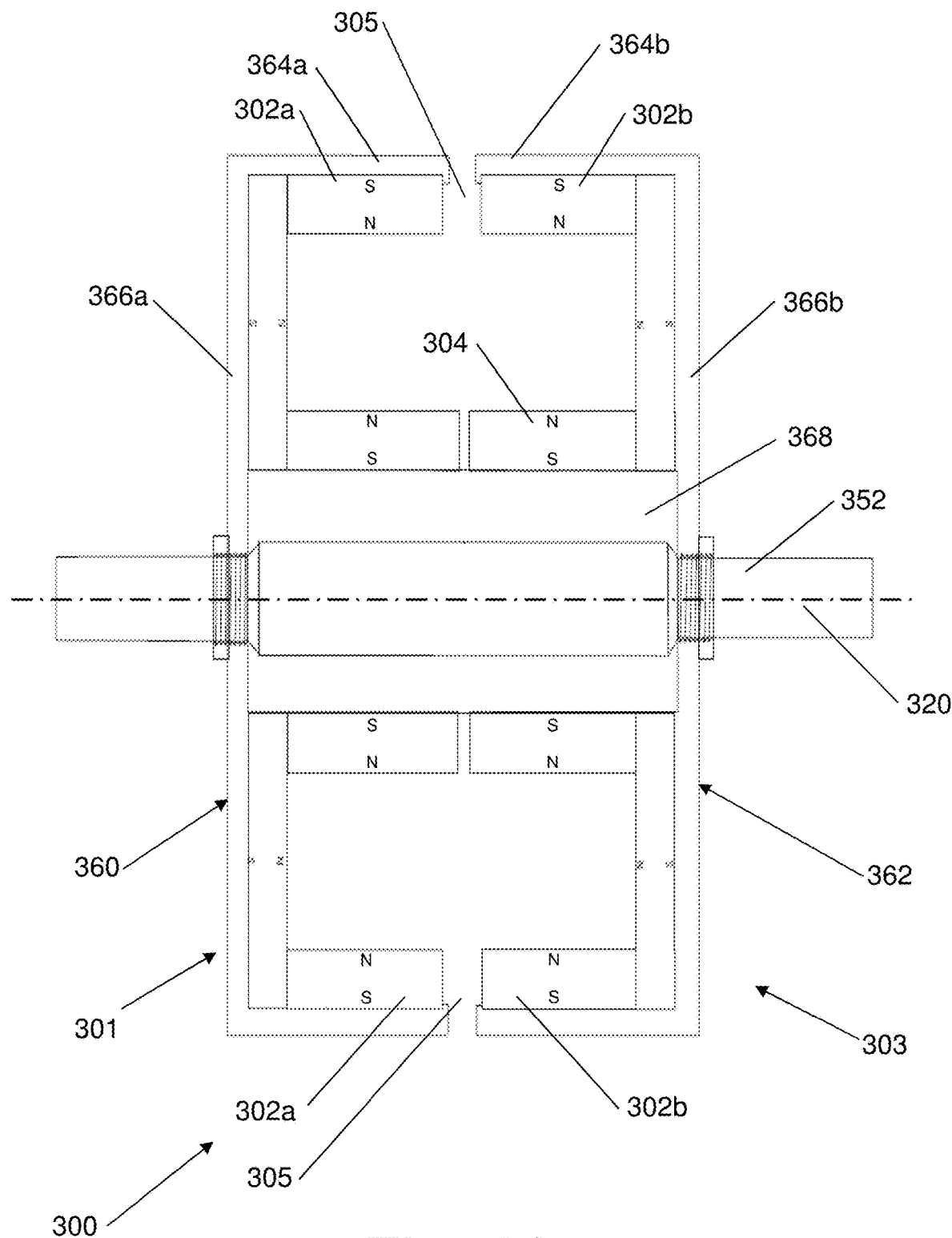

FIGS. 3a through 3f illustrate an embodiment where a partial toroidal magnetic cylinder is configured as a rotor 300 in an electric motor or generator (not shown). FIG. 3a is a perspective view of two partial toroidal magnetic cylinders, each generating magnetic fields of opposite polarities. FIG. 3b illustrates the two partial toroidal magnetic cylinders joined together to act as the rotor 300. FIG. 3c is an exploded isometric view illustrating two halves or magnetic assemblies 301 and 303 which form the rotor 300. FIG. 3d is an isometric view of magnetic assembly 303 from an opposing angle showing details of the assembly which are not visible in FIG. 3c. FIG. 3e is section view of the rotor 300 which is transverse to the longitudinal axis 320 and illustrates details of the magnetic assembly 301. FIG. 3f is a section view taken at and parallel to the longitudinal axis 320 showing the magnetic assembles 301 and 303 coupled together to form the rotor 300.

FIG. 3a illustrates a partial toroidal magnetic cylinder 350 which is conceptually similar to the partial toroidal magnetic cylinder 100 discussed above in reference to FIGS. 1, 2a and 2b. As illustrated, there is an outer magnetic wall 302 and an inner magnetic wall 304. In addition to the partial cylindrical magnetic walls 302 and 304, there may also be magnetic side walls 370 and 372 which in this illustrated embodiment may be made of a plurality of wedge shape members or magnets. A section cut radially through the outer magnetic wall 302, the inner magnetic wall 304, and the magnetic side walls 370 and 370 would reveal a section of the four walls similar to the end 314 illustrated in FIG. 3A. The center of that section is known as the "sectional center." The individual magnets in the magnetic walls all have their common or "like" magnetic poles (e.g. north poles) pointing towards an interior 324 of the partial toroidal magnetic cylinder 350. Although the shapes and number of the individual magnets of the partial toroidal magnetic cylinder 350 are different than the shape and number of individual magnets of the partial toroidal magnetic cylinder 100, the flux lines and magnetic fields are conceptually similar. In other words, the flux lines generated from an individual magnet of the partial toroidal magnetic cylinder 350 starts, for instance, at its north pole which is facing towards the interior 324 or "tunnel" of the partial toroidal magnetic cylinder 350. The flux lines then are channeled through the interior 324 of the partial toroidal magnetic cylinder 350 and flow out an open or terminating end, for instance, the end 314 into a throat or open area 315. The flux lines then follow around the exterior of the partial toroidal magnetic cylinder 350 and back to the south pole of the individual magnet. Such flux line action is described in detail with reference to the partial toroidal magnetic cylinder 100 described above. Thus, the partial toroidal magnetic cylinder 350 generates a flux field which is conceptually similar to the flux field 125 discussed above.

In some embodiments, when the partial toroidal magnetic cylinder 350 is designed to act as part of a rotor, it may be preferable to have a portion of the throat or the open area 315 filled with weights so to balance the mechanical rotation of the partial toroidal magnetic cylinder 350 when it turns about its center axis. In certain embodiments, a plurality of magnets may be used as balancing weights and/or to contribute to the overall power or current produced. If magnets are used in the throat 315, their polarities are reversed so as to not collapse the magnetic field created by the partial toroidal magnetic cylinder 350. In other words, two partial toroidal magnetic cylinders are used to form a single toroidal magnetic cylinder which may be used as a rotor or portion of a rotor.

A second partial toroidal magnetic cylinder 380 is designed to "fit" within the open area 315. The flux field generated by the second partial toroidal magnetic cylinder 380 is conceptually similar in shape to the flux field generated by the first partial toroidal magnetic cylinder 350 or 100 (discussed above in reference to FIG. 1). Specially, the flux lines from the magnets forming the second partial toroidal magnetic cylinder 380 run inward from the face of the magnets, then are channeled through the interior 384 or "tunnel" of the partial toroidal magnetic cylinder 380 and flow out an open or terminating end, for instance, the end 386. The flux lines then follow around the exterior of the partial toroidal magnetic cylinder 380 and back to the opposing pole of the individual magnet.

FIG. 3b illustrates a complete toroidal magnetic cylinder 390 formed from combining the two partial toroidal magnetic cylinders 350 and 380 where the partial toroidal magnetic cylinders each have opposite magnetic polarities and magnetic fields. The flux field formed by the partial toroidal magnetic cylinder 380 is said to have an opposite polarity from the flux field formed by the partial toroidal magnetic cylinder 350. In other words, the magnets of the partial toroidal magnetic cylinder 380 are positioned such that their like poles are in an opposite direction from the magnets forming the partial toroidal magnet cylinder 350. For instance, the like poles (e.g., the north poles) of the magnets forming the partial toroidal magnetic cylinder 350 all face inward towards the tunnel 324. In contrast, the like poles (e.g., the north poles) of the magnets forming the partial toroidal magnetic cylinder 380 all face outward away from the tunnel 384. Obviously, with regard to the partial toroidal magnetic cylinder 350, it does not matter whether the north poles of the magnets face inward or the south poles face inward as long as the magnets forming the partial toroidal magnetic cylinder 380 have their respective like poles reversed.

In certain embodiments, the toroidal magnetic cylinder 390 may be assembled in longitudinal portions or halves: such as a first longitudinal portion 392 and a second longitudinal portion 394. For instance, the longitudinal portion 392 may be incorporated into first a magnetic assembly 301 (FIG. 3*c*) and the longitudinal portion 394 may be incorporated into a second magnetic assembly 303 (FIG. 3*c*).

When the magnetic assemblies 301 and 303 are coupled together as illustrated in FIG. 3*f*, they create two outer magnetic cylinder walls 302*a* and 302*b* and inner magnetic cylinder wall 304. When the magnetic assemblies 301 and 303 are coupled together, the outer magnetic cylinder walls 302*a* and 302*b* are conceptually similar to the outer cylinder wall 102 discussed above, except there is a slot 305 defined between to allow a portion of a stator (not shown) to pass through. Similarly, the inner magnetic cylinder wall 304 is conceptually similar to the inner cylinder wall 104 discussed above. As illustrated in FIGS. 3*c* and 3*d*, it can be seen that the outer magnetic cylinder walls 302*a* and 302*b* are comprised of a plurality of individual magnets 306. Similarly, the inner magnetic cylinder wall 304 may be comprised of a plurality of individual magnets 308.

As with the partial toroidal magnetic cylinder 100 discussed above, only one polarity of the magnets in the plurality of magnets 306 and 308 are utilized within (or facing into) an interior cavity 324 of the toroidal magnetic cylinder or rotor 300 forming a region of magnetic concentration. For instance in the illustrative embodiment of FIG. 3*d*, the north poles of the plurality of magnets 306 are each pointing radially towards a longitudinal axis 320 of a longitudinal shaft 352. On the other hand, the north poles of the plurality of magnets 308 each point radially away from the longitudinal axis 320 and towards the interior cavity 324 of the magnetic assembly 303 (or the rotor 300 when assembled).

In addition to the partial cylindrical magnetic walls 302 and 304, there may also be magnetic side walls 370 and 372 which in this illustrated embodiment may be made of a plurality of wedge shape members. When the magnetic assemblies 301 and 303 are coupled together, the side walls 370 and 372 join the exterior cylindrical wall 302 to the interior cylindrical wall 304. In certain embodiments, the side walls 370 and 372 may be made of a plurality of side wall magnets 374. When the side wall members are a plurality of side wall magnets 374, the magnets have their common poles facing the interior of the toroidal center 324. For instance, if the common pole (e.g., north pole) of the plurality of magnets 306 and 308 point towards the toroidal interior cavity 324, the north pole of the magnets 374 would also have their north poles pointing towards the toroidal center cavity 324. Thus, the plurality of magnets 374 would also contribute to the cumulative magnetic flux field produced by the inner and outer partial toroidal magnetic cylinders 302 and 304 as explained above and explained in detail with reference to FIG. 1.

A second group of magnets positioned within the "throat" form a portion of the second partial toroidal cylinder 380. For sake of illustration, such magnets are labeled in FIG. 3*d* with an "S" representing a facing "South" pole—as opposed to the magnets labeled with an "N" representing a facing "North" pole.

In certain embodiments, there may be a first outer support 360 to position and structurally support the plurality of magnets 304, 306, and 374 comprising a portion of the magnetic assembly 301. There may also be a second outer support 362 to position and structurally support the plurality of magnets 304, 306, and 374 that are a part of the magnetic assembly 303. In certain embodiments, the outer support 360 may be formed by a cylindrical wall 364*a* (FIG. 3*c*) and a side wall 366*a* (FIG. 3*f*). Similarly, the outer support 362 may be formed a cylindrical wall 364*b* and a side wall 366*b* (FIGS. 3*c* and 3*f*). The outer supports 360 and 362 may be formed from either non-conductive materials or conductive materials, such as steel, iron, or aluminum, depending on the design requirements and ultimate application of the motor.

In the embodiment illustrated in FIGS. 3*a* through 3*f*, there may also be an inner support or hub 368 (see FIG. 3*d*), which positions and structurally supports the inner magnetic cylinder 304. In certain embodiments, the hub 368 may be coupled to one of the outer supports, such as the outer support 362. The hub 368 may also be coupled to a longitudinal shaft 352 by conventional means known in the art (see FIG. 3*d*).

In certain embodiments, the longitudinal shaft 352 may be made from an iron, steel or similar alloy. The hub 368 may be made from iron, steel or similar alloy, or a ferrite compound. In some embodiments, the ferrite compound or powder may be suspended in a viscous material, such as an insulating fluid, a lubricant, motor oil, a gel, or mineral oil.

As discussed above, the magnets of the plurality of magnets 306, 308 and 374 may be made of out any suitable magnetic material, such as: neodymium, Alnico alloys, ceramic permanent magnets, or electromagnets. The exact number of magnets or electromagnets will be dependent on the required magnetic field strength or mechanical configuration.

FIG. 3*e* is an interior view of the magnetic assembly 301 taken perpendicular to the longitudinal axis 320. At the outer periphery, the cylindrical wall 364*a* of first outer support 360 is shown encapsulating the magnetic assembly 301. In proximity to the cylindrical wall 364*a*, there is outer magnetic cylinder wall 302*a* comprising the plurality of magnets 306. In the illustrative embodiment, there are approximately sixteen (16) magnets in the plurality of magnets 306. As illustrated by the arrows 310, each of the magnets in the plurality of magnets 306 has its north pole facing inwards towards the longitudinal axis 320. Similarly, at the inner face of the partial cylinder, there is the inner magnetic wall 304. In this illustrative embodiment, the inner magnetic wall 304 comprises the plurality 308 of seven (7) magnets where each of the seven magnets has its north pole facing away from the longitudinal axis 320 as represented by the arrows 312. Also illustrated is the magnetic side wall 366*a* comprising the plurality of magnets 374 which include twelve (12) side wall magnets having their north poles facing away from the paper or towards the interior cavity 324 (when assembled into one rotor 300 as illustrated in FIG. 3b).

Thus, when the common pole (i.e., north pole) magnets comprising the plurality of magnets 306, 308, and 374 are viewed as illustrated in FIG. 3e, it is apparent that they form a first portion or one half 392 of a partial toroidal magnetic cylinder 350 (FIG. 3b), similar to the partial toroidal magnetic cylinder 100 discussed in reference to FIG. 1. When combined with the opposing portion or half 394 of magnetic assembly 303 (not shown in FIG. 3e), it is apparent that the flux lines and the resulting magnetic field 325 (not shown for clarity) will be conceptually similar to the flux lines 112 and the magnetic field 125 discussed above in reference to FIG. 1.

As illustrated in FIG. 3e, the throat area 315 is generally within the area defined by an angle β taken about the longitudinal axis 320. In the illustrative embodiment, the magnets within this area or throat include two magnets 328a and 328b which form a portion of an interior cylindrical wall, four magnets 330 which form a portion of a side wall, and four magnets 332 which form a portion of an exterior cylindrical wall. In contrast to the plurality of magnets 306, 308, and 374, comprising the partial toroidal magnetic cylindrical where there "common" (e.g., north poles) all face inward towards the interior cavity 324, the magnets 328, 330, and 332 have their "common" (e.g., south poles) all facing inwards towards the interior cavity 324.

Thus, as discussed above, the magnets 328, 330, and 332 may form the second partial magnetic toroidal cylinder 380 where the magnets in the magnetic toroidal cylinder 380 are positioned such that their like poles are opposite to the like poles of the magnets forming the first partial magnetic toroidal cylinder 350 (see FIG. 3a). When fully assembled, the first partial magnetic toroidal cylinder 350 and the second partial magnetic toroidal cylinder 380 form the complete toroidal cylinder 390 (FIG. 3b) having two distinct magnetic fields. Unlike typical electric motors and generators, the angle β can be anywhere from 180 degrees to as little as approximately 25 degrees. However, if either of the partial toroidal magnetic cylinders 350 or 380 were to be completely filled with magnets of like poles to those making the cylinders, the external magnetic field 325 (or the magnetic field 125 discussed in reference to FIG. 1) would collapse rendering the field practically useless for energy conversion.

Similar to the embodiment discussed in reference to in FIG. 1, the partial toroidal magnetic cylinder 350 thus has two magnetic ends 314 and 316 that are functionally equivalent to the open throat as shown in FIG. 1 with ends 314 and 316 forming the throat 315 between the two magnetic ends.

Figure 4A:
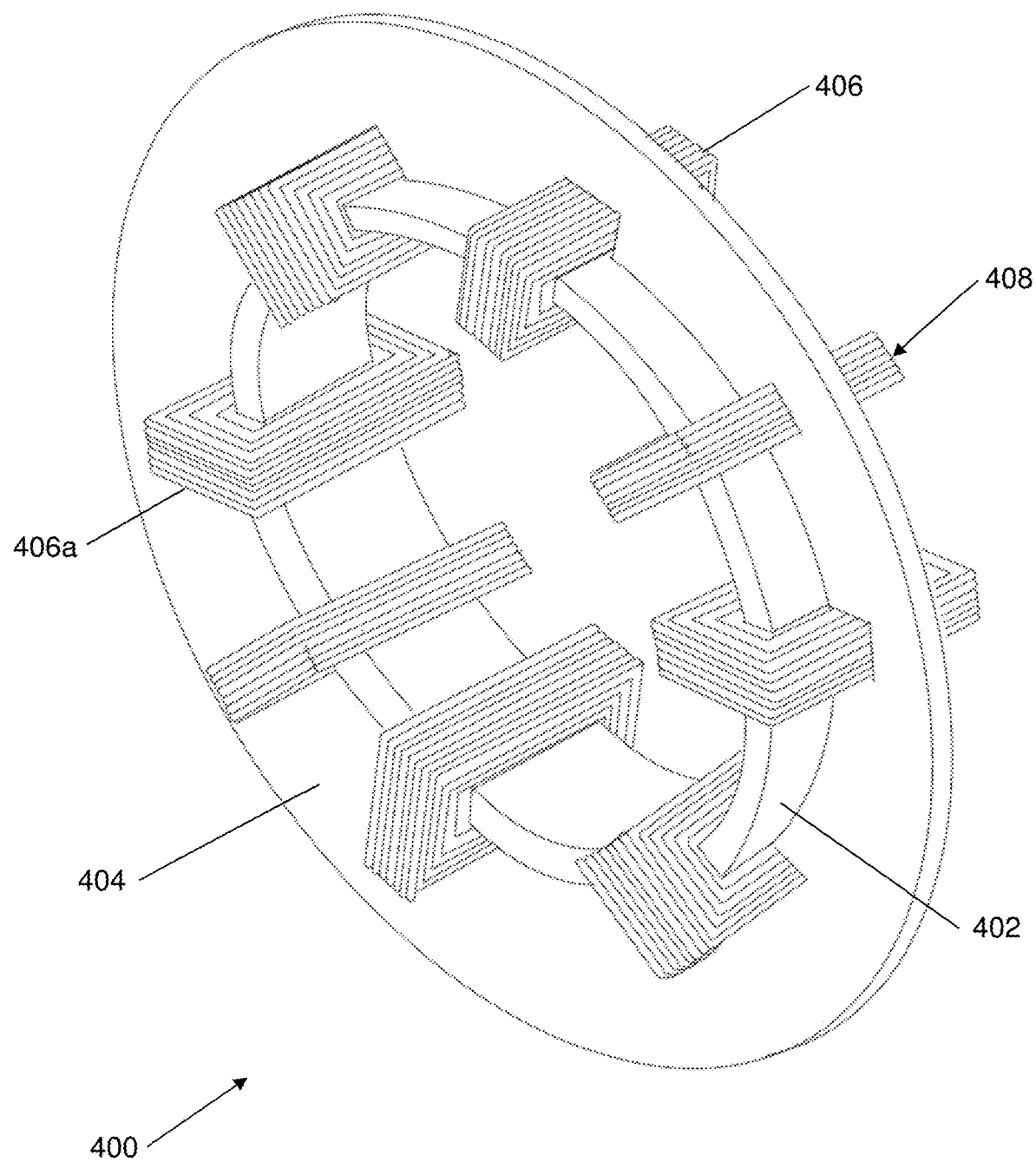
FIGS. 4a through 4d are conceptualized views of a coil assembly functioning as a stator.
Figure 4B:
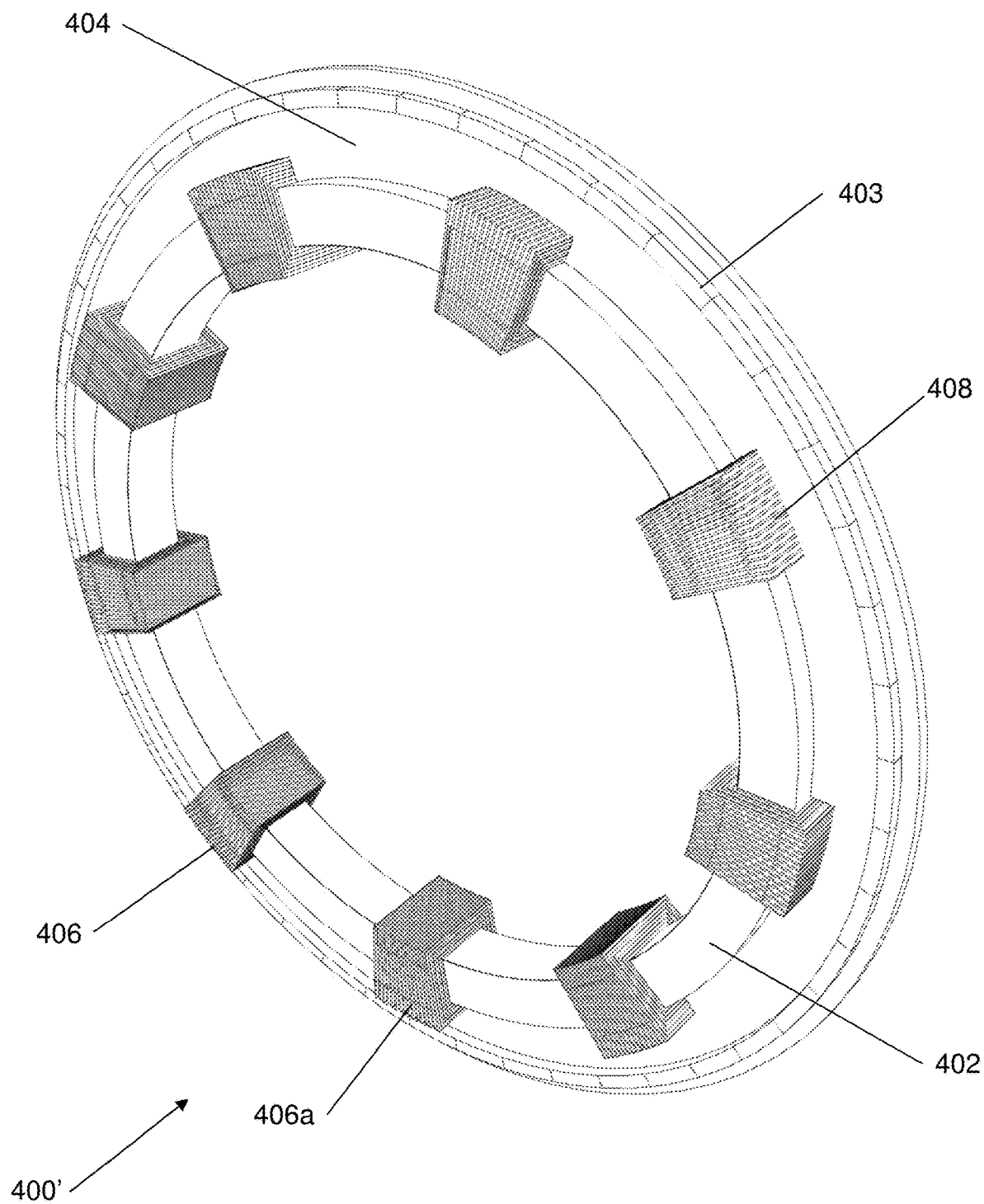
Figure 4C:
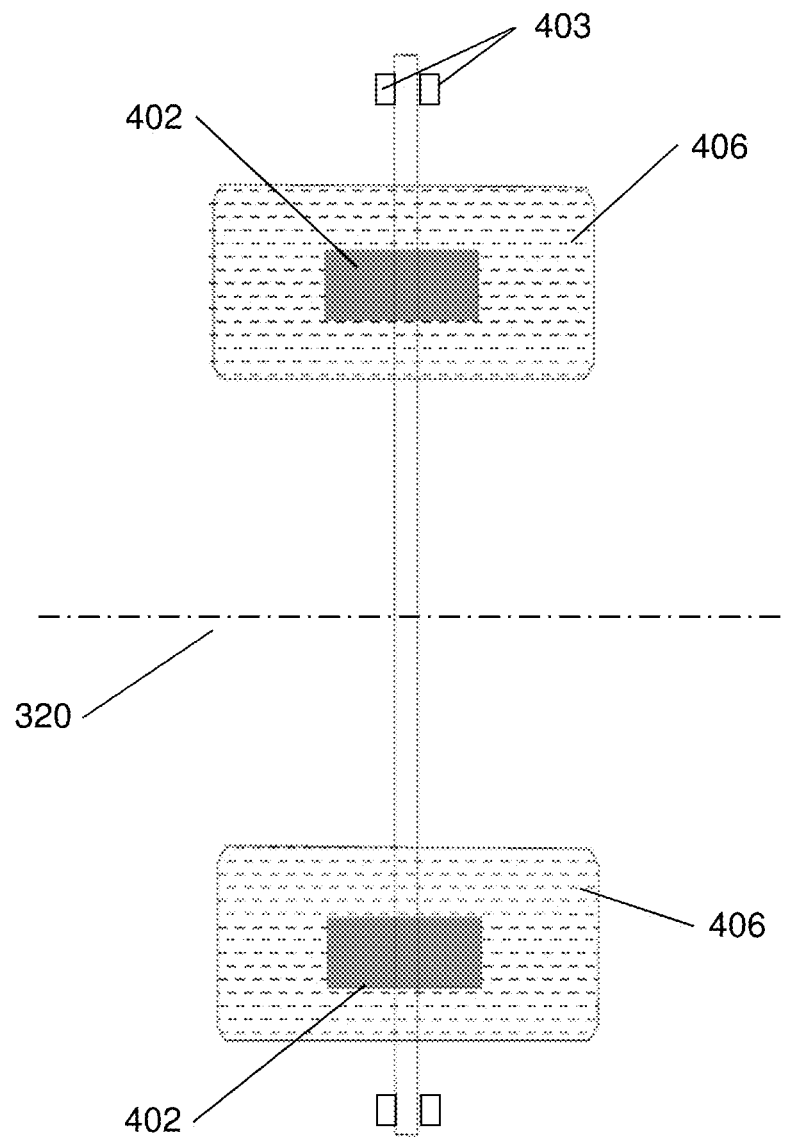
Figure 4D:
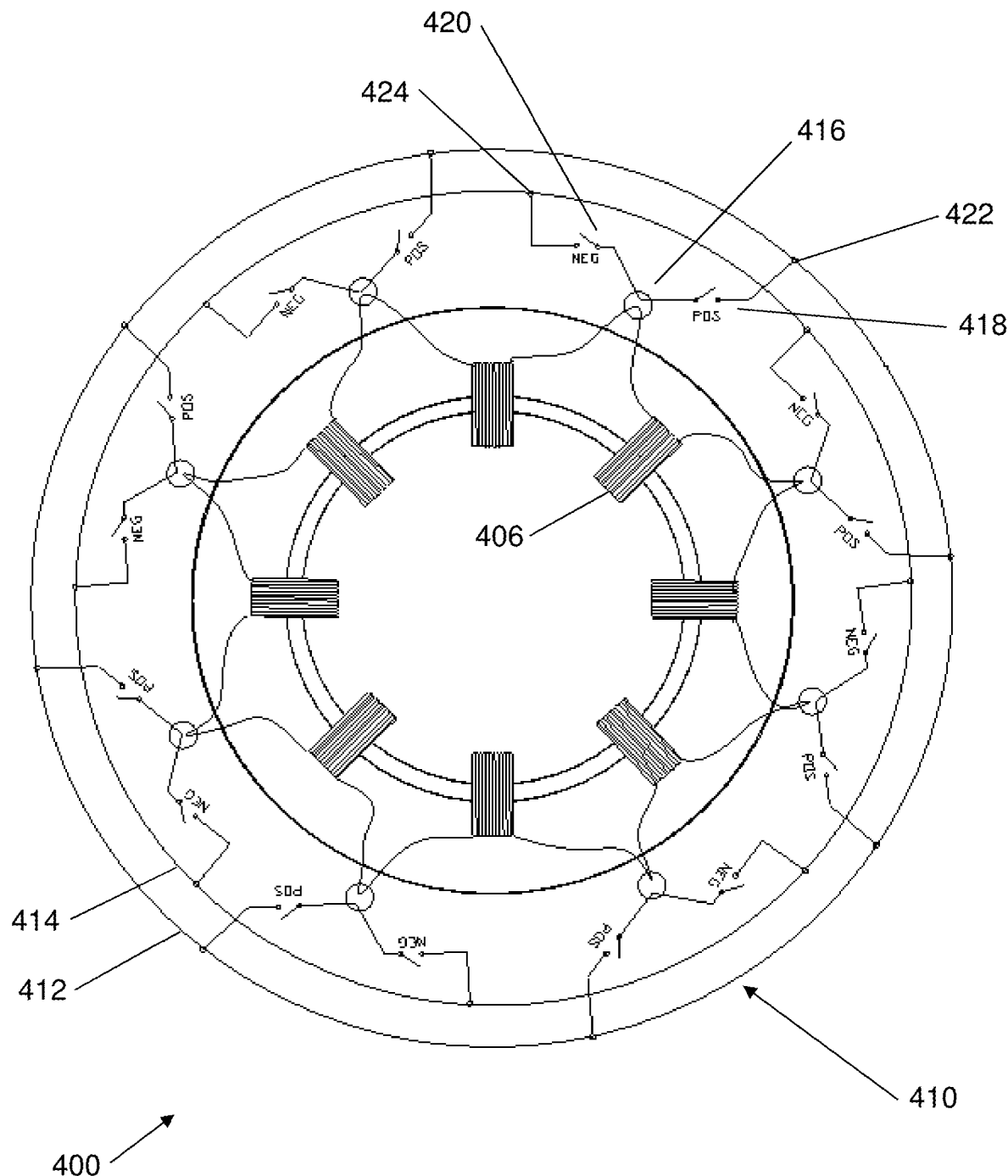

Turning now to FIG. 4a, there is one illustration of a coil assembly functioning as a stator 400 which may be used in conjunction with the rotor 300 of FIGS. 3a through 3d. In FIG. 4a, there is illustrated an isometric view of the stator 400. FIG. 4b illustrates an isometric view of a similar, but alternative embodiment of a stator 400'. FIG. 4c illustrates a section view of the stator 400 or the stator 400'. FIG. 4d illustrates a conceptual wiring diagram for one embodiment of the stator 400.

As can be seen from FIGS. 4a and 4c, the stator 400 or the stator 400' comprises a cylindrical or ring core, such as an iron core 402, a connecting ring support assembly 404 and a plurality of coils or windings 406 (or, alternatively, at least one coil or winding). The iron core 402 is conceptually similar to the core 110 discussed above in reference to FIG. 1. The iron core 402 is coupled to the plurality of coils 406 using conventional fastening methods known in the art. (In other embodiments, the iron core 402 may consist of two or more segments which may be fastened together to form a complete ring or core. These embodiments may have the benefit of allowing the plurality of coils 406 to be built on conventional forms then added to the ring segments.) Although an iron core is used in this embodiment as a magnetic flux line concentrator, other core materials maybe used when design considerations such as mechanical strength, reduction of eddy currents, cooling channels, etc. are considered. In fact, certain embodiments may not use the central iron core 402.

In the embodiment illustrated in FIGS. 4a to 4c, the plurality of coils 406 are positioned radially about the core 402 to form a coil assembly 408. Each individual coil 406a in the coil assembly 408 may be made from a conductive material, such as copper (or a similar alloy) wire and may be constructed using conventional winding techniques known in the art. In certain embodiments, the individual coils 406a may be essentially cylindrical or rectangular in shape being wound around a coil core (not shown) having a center opening sized to allow the individual coil 406a to be secured to the core 402. The windings of each coil 406a are generally configured such that they remain transverse or perpendicular to the direction of the relative movement of the magnets comprising the rotor 300 and parallel with the longitudinal axis. In other words, the windings are positioned such that their sides are parallel with the longitudinal axis and their ends are radially perpendicular to the longitudinal axis. The windings are also transverse with respect to the magnetic flux produced by the individual magnets of the rotor at their interior face as described above. Consequently, the entire winding or windings may be used to generate movement (in motor mode) or voltage (in generator mode).

The number of coils 406 can be any number that will physically fit within the desired volume and of a conductor length and size that produces the desired electrical or mechanical output as known in the art. In certain embodiments, the coils 406 may be essentially one continuous coil, similar to a Gramme Ring as is known in the art.

In embodiments using the coil assembly as a stator, the circumferential or transverse slot formed within the exterior cylinder wall 102 (FIG. 1) may allow the flux formed within the tunnel to leak out of the tunnel. This "leakage flux" through the transverse slot may be redirected back into the tunnel by coupling a series or plurality of radial magnets 403 to the connecting ring support 404 close to where the connecting ring intersects the transverse slot (not shown). The plurality of magnets 403 may be oriented similar to the cylinder magnets 106 of the cylinder 100 (not shown in FIG. 3). In other words, the plurality of magnets 403 may be oriented such that their common poles (i.e., north pole) face the interior cavity 124 of the tunnel. In other embodiments, the plurality of magnets 403 are orientated so they just establish a transverse flux field to redirect the leakage flux back into the tunnel. In certain embodiments, the plurality of magnets 403 may be placed on each side of the connecting ring support 404 as illustrated in FIG. 4b. In yet other embodiments, the plurality of magnets may be placed within the connecting ring support 404.

FIG. 4c is a conceptual exemplary wiring diagram of the stator 400. A power rail 410 is represented by an outer circle or wire 412 representing a positive supply and an inner circle or wire 414 representing a negative supply. In this embodiment, the coils 406 are connected in series with each other and the leads from each coil 406 are brought out to a junction point 416 which is then connected to a positive switch 418 which, in turn, is connected to the positive supply 412 of the power rail 410. The junction point 416 is also connected to a negative switch 420 which is connected to the negative supply 414 of the power rail 410. Each positive switch 418 connects to a positive injection point 422 and each negative switch 420 connects to the negative power injection point 424 of the power rail 410.

Figure 4E:
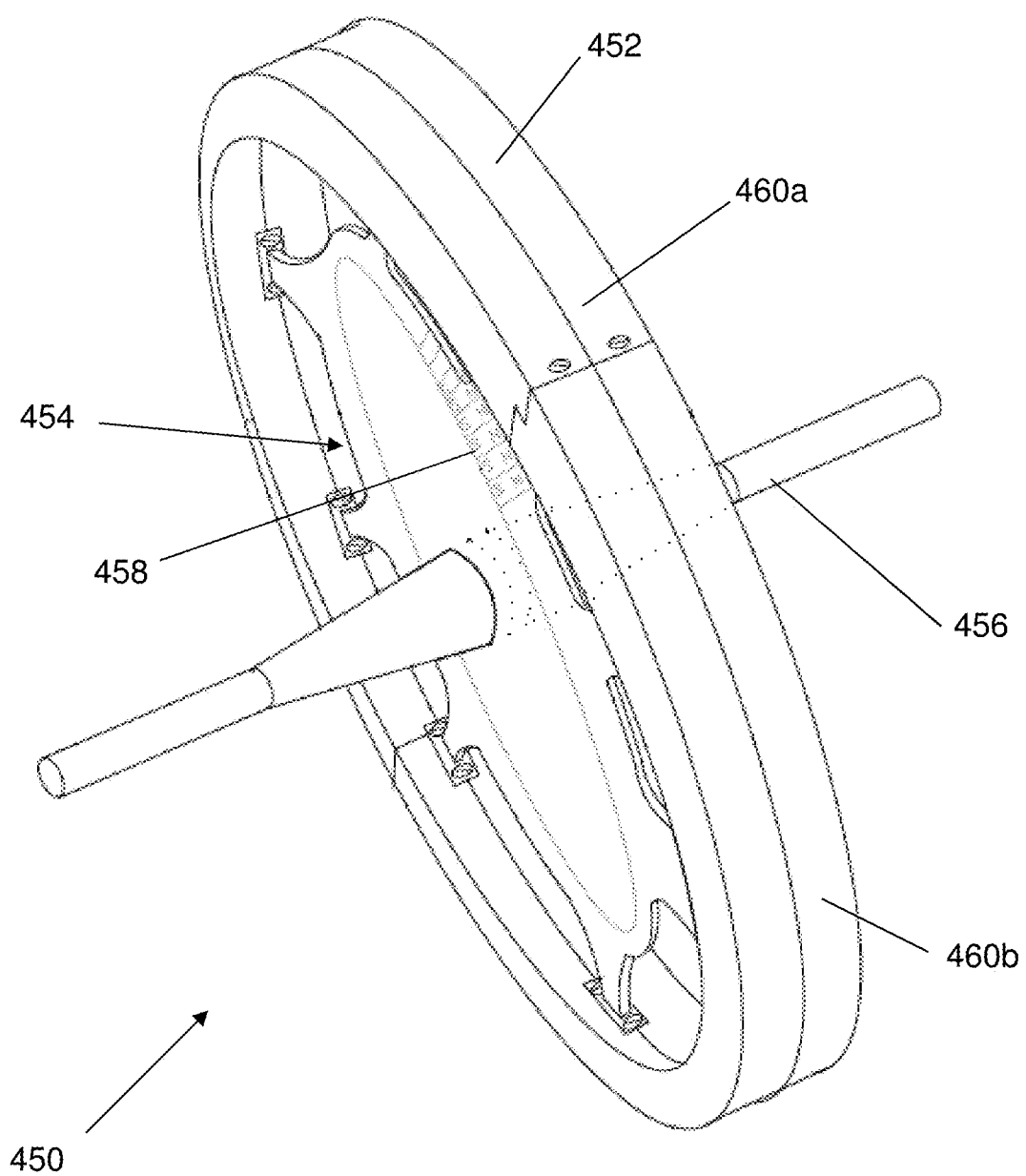
FIGS. 4e and 4f are conceptualized views of a coil assembly functioning as a rotor.
Figure 4F:
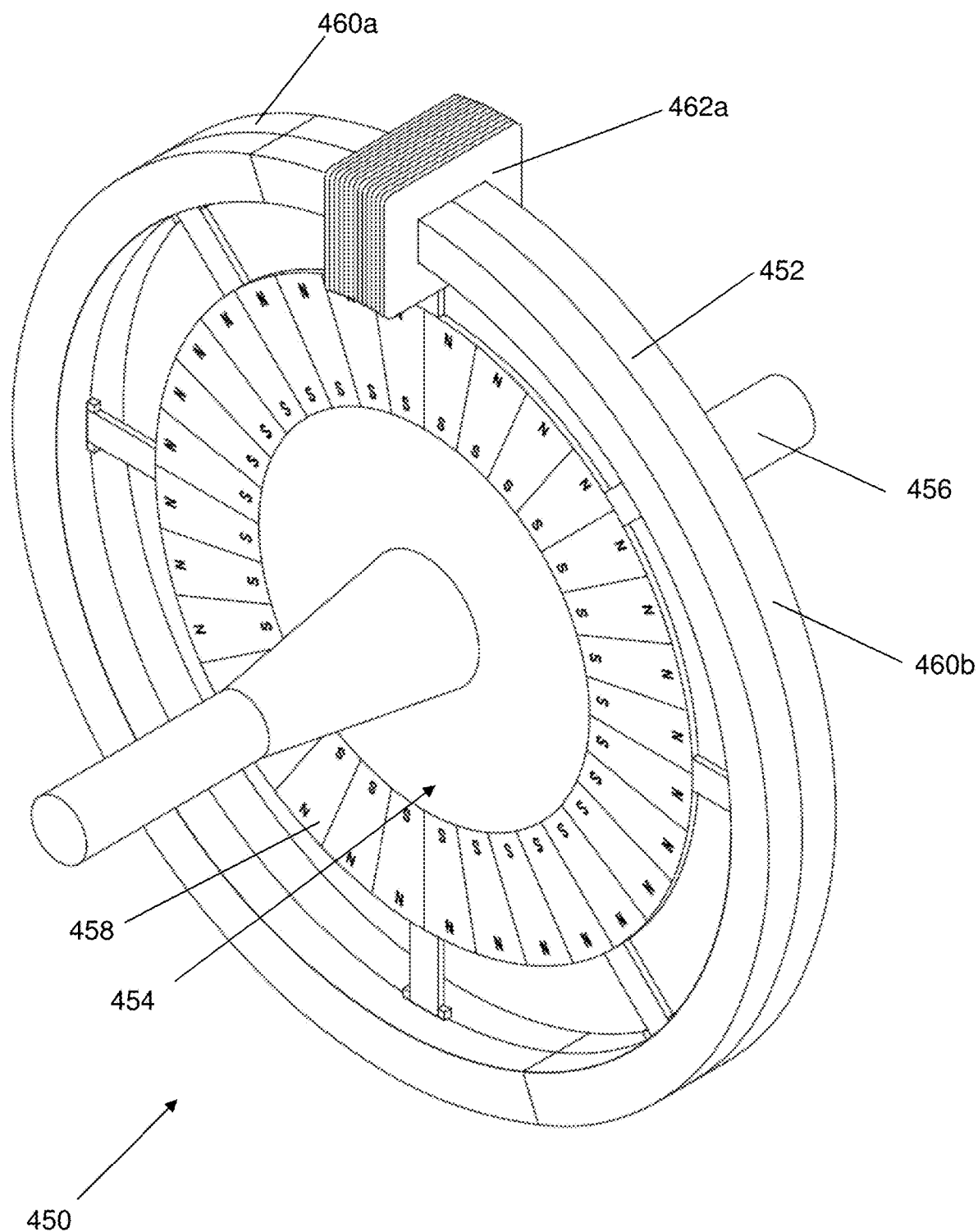

FIG. 4e and FIG. 4f illustrate an alternative embodiment of a coil assembly functioning as a rotor 450. Turning now to FIG. 4e, there is presented an isometric view of a one embodiment of an assembly 450 comprising an iron core 452, a rotor hub 454 and shaft 456. The iron core 452 is conceptually similar to the core 110 discussed above. The iron core 452 and the rotor hub 454 are fastened to a shaft 456 using conventional fastening methods known in the art. In certain embodiments the rotor hub 454 may be composed of non-ferrous materials to eliminate the production of eddy currents. When assembled with the partial magnetic cylinder 100, a transverse slot or circumferential (not shown) in the inner wall 104 of the partial magnetic cylinder (not shown in FIG. 4e) allows a portion of the rotor hub 454 to extend through the inner wall 104 of the partial magnetic cylinder 100 and into the interior cavity 124 to position the core 452 within the interior cavity of the partial magnetic cylinder (See FIG. 2b).

In other embodiments, the iron core 452 may consist of two or more segments 460a and 460b which may be fastened together to form a complete ring or core. This configuration may have the benefit of allowing a plurality of coils to be built on conventional forms then added to ring segments.

FIG. 4e illustrates an isometric view of the rotor assembly 450 where the core 452 comprises the core segment 460a and the core segment 460b. A single coil 462a is illustrated and positioned about the core segment 460b. In certain embodiments, there may be a plurality of coils 462 rotationally positioned about the core 452 as described above when the coil assembly acts as a stator. Each individual coil 462a may be made from a conductive material, such as copper (or a similar alloy) wire and may be constructed using conventional winding techniques known in the art. In certain embodiments, the individual coils 462a may be essentially cylindrical in shape being wound around a coil core (not shown) having a center opening sized to allow the individual coil 462a to be secured to the core 452.

In embodiments using the coil assembly as a rotor, the circumferential or transverse slot formed within the interior cylinder wall 104 (FIG. 1) may allow the flux formed within the tunnel to leak out of the tunnel. This "leakage flux" through the transverse slot may be redirected back into the tunnel by coupling a series or plurality of radial magnets 458 to the rotor hub 454 close to where the rotor hub intersects the transverse slot. The plurality of magnets 458 may be oriented similar to the cylinder magnets 106 of the cylinder 100 (not shown in FIG. 3). In other words, the plurality of magnets 458 may be oriented such that their common poles (i.e., north pole) face the interior cavity 124 of the tunnel. In certain embodiments, the plurality of magnets 138 will move with the rotor assembly 450. In yet other embodiments, the plurality of magnets are orientated so they just establish a transverse flux field to redirect the leakage flux back into the tunnel. In certain embodiments, the plurality of magnets may be placed on each side of the hub 454. In yet other embodiments, the plurality of magnets may be placed within the hub 454.

Figure 5A:
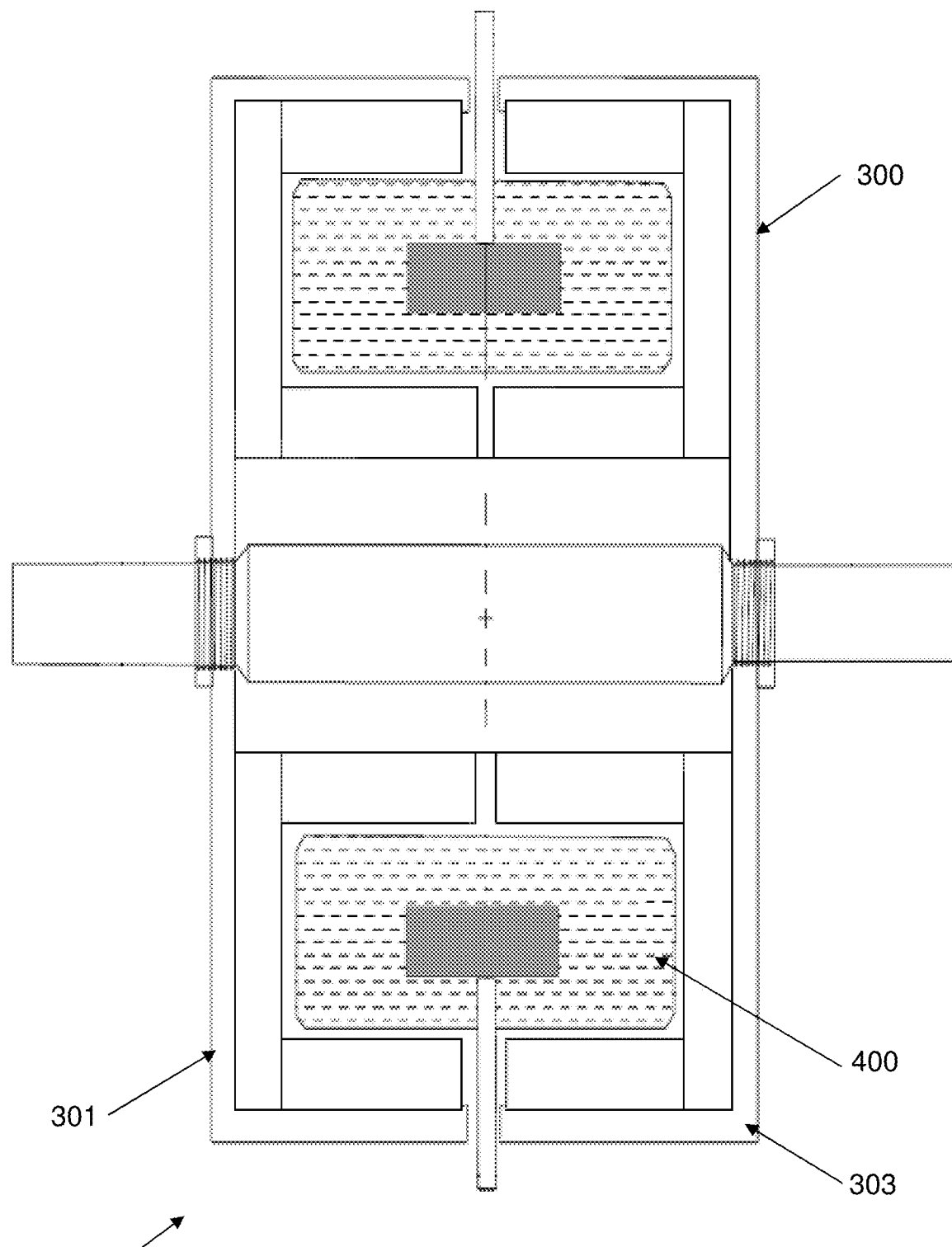
FIGS. 5a through 5e are conceptualized views of a motor generator assembly combining the rotor and stator.
Figure 5B:
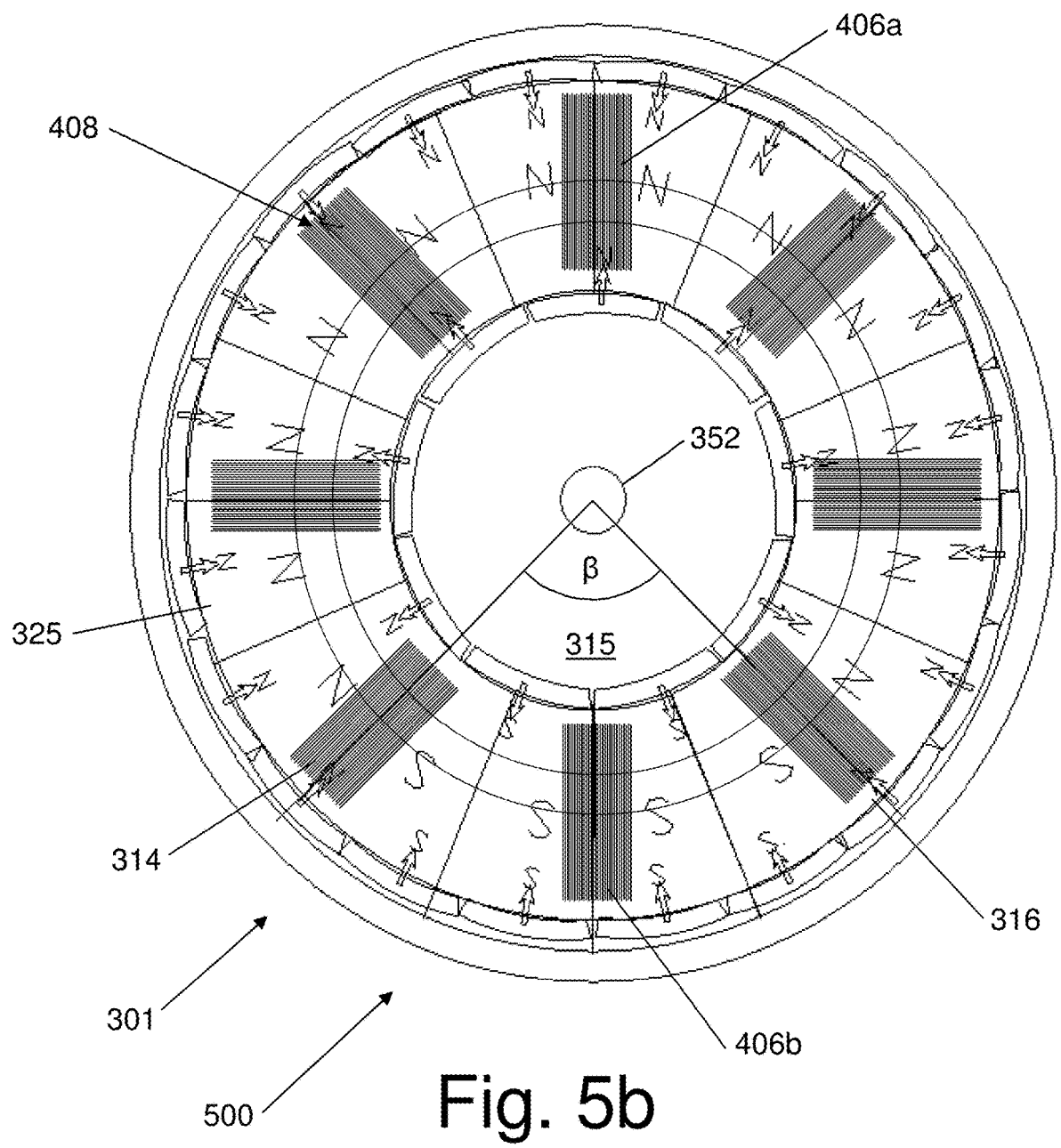
Figure 5C:
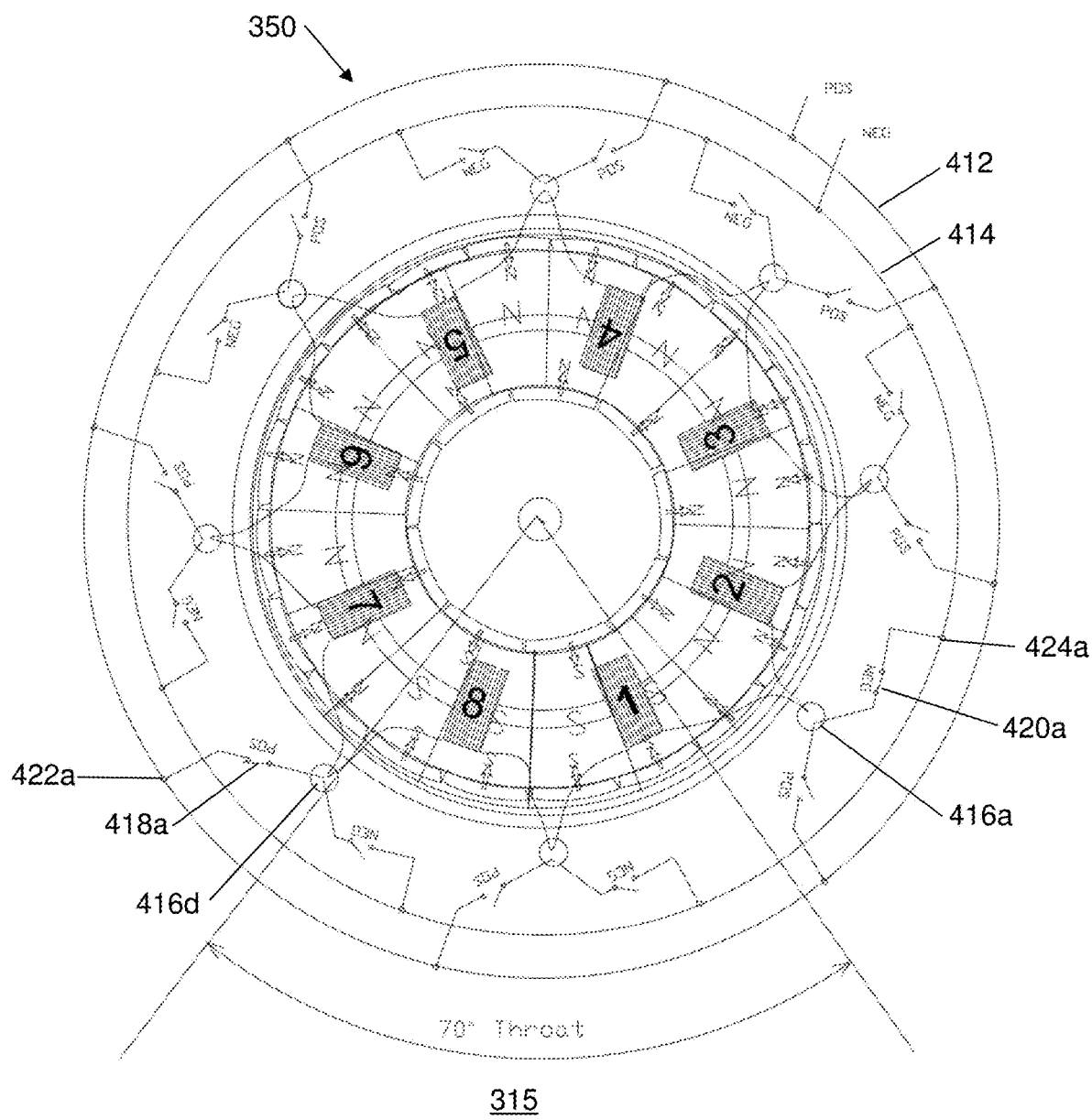
Figure 5D:
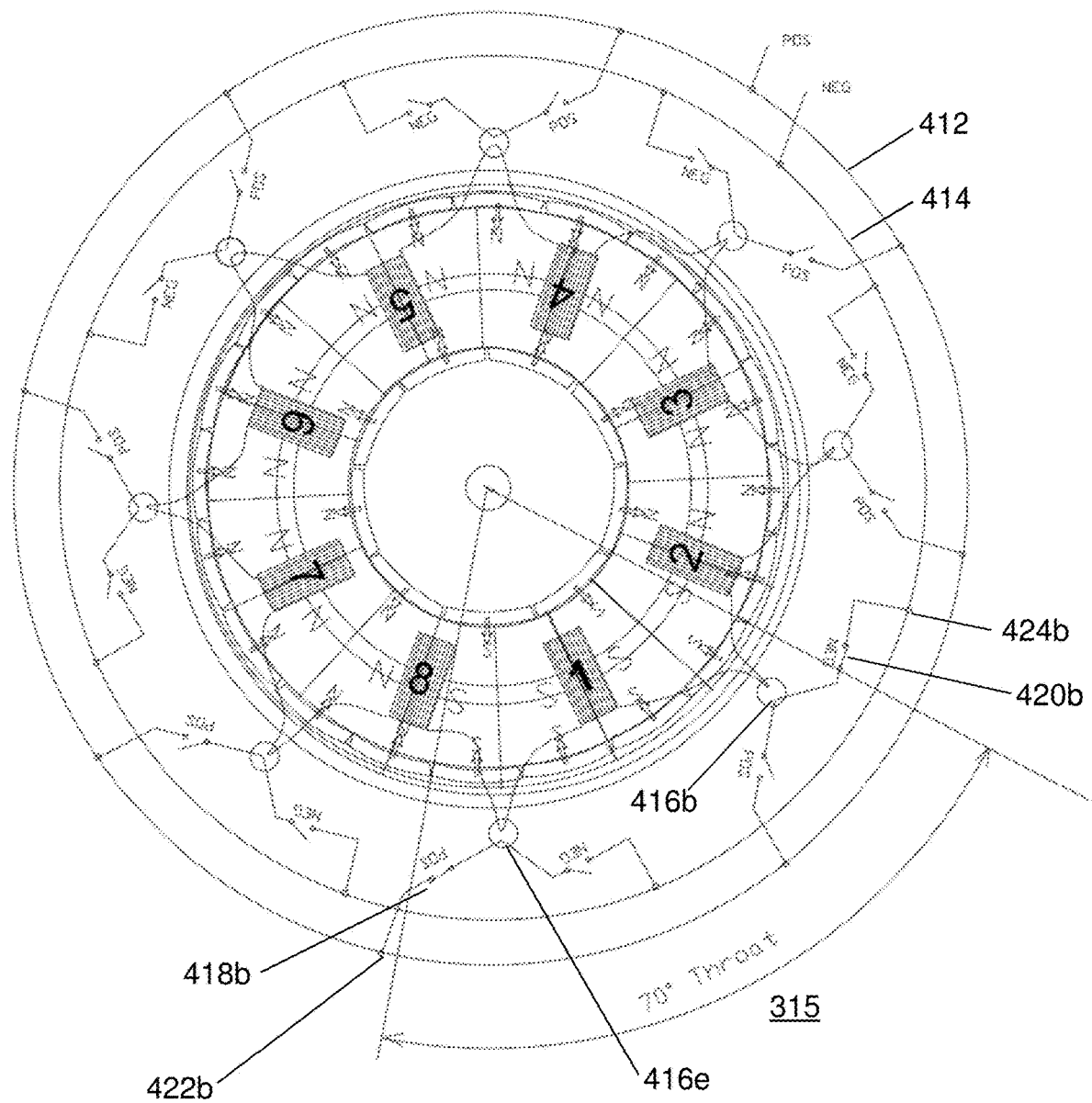
Figure 5E:
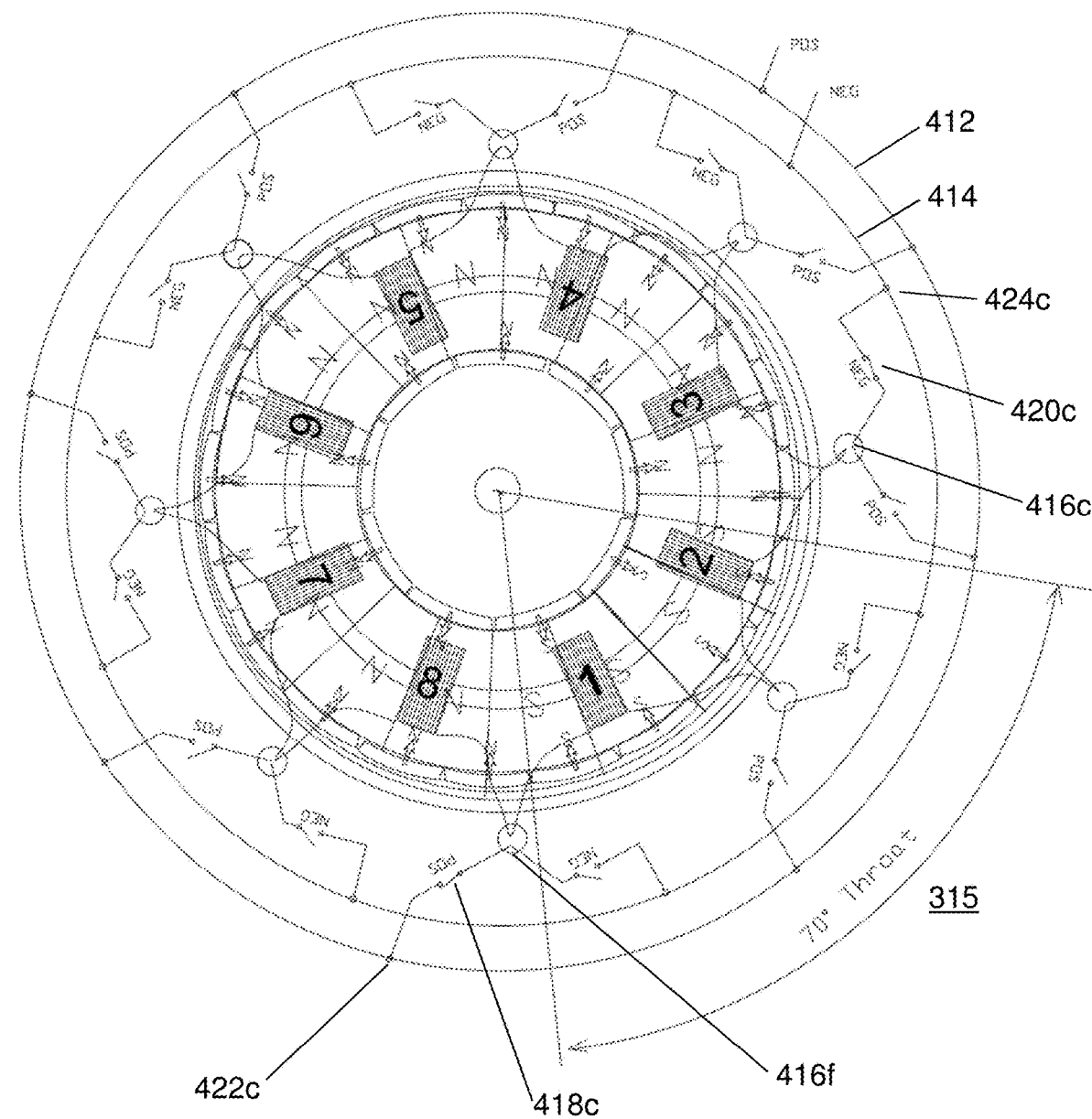

FIG. 5a is a cross-sectional view of one embodiment of an electric motor/generator assembly 500 illustrating the stator 400 positioned within the first magnetic assembly 301 and the second magnetic assembly 303 of the rotor 300. FIG. 5b is a transverse cross-section of one embodiment of an electric motor/generator assembly 500 illustrating the coil assembly 408 of the stator 400 positioned within the magnetic assembly 301 of the rotor 300. FIG. 5c is a transverse cross-section of one embodiment of an electric motor/generator assembly 500 illustrating the switch configuration of the coil assembly 408 when the magnetic assembly 301 of the rotor 300 is in a first rotational position. FIG. 5d is a transverse cross-section of one embodiment of an electric motor/generator assembly 500 illustrating the switch configuration of the coil assembly 408 when the magnetic assembly 301 of the rotor 300 is in a second rotational position. FIG. 5e is a transverse cross-section of one embodiment of an electric motor/generator assembly 500 illustrating the switch configuration of the coil assembly 408 when the magnetic assembly 301 of the rotor 300 is in a third rotational position.

Figure 6A:
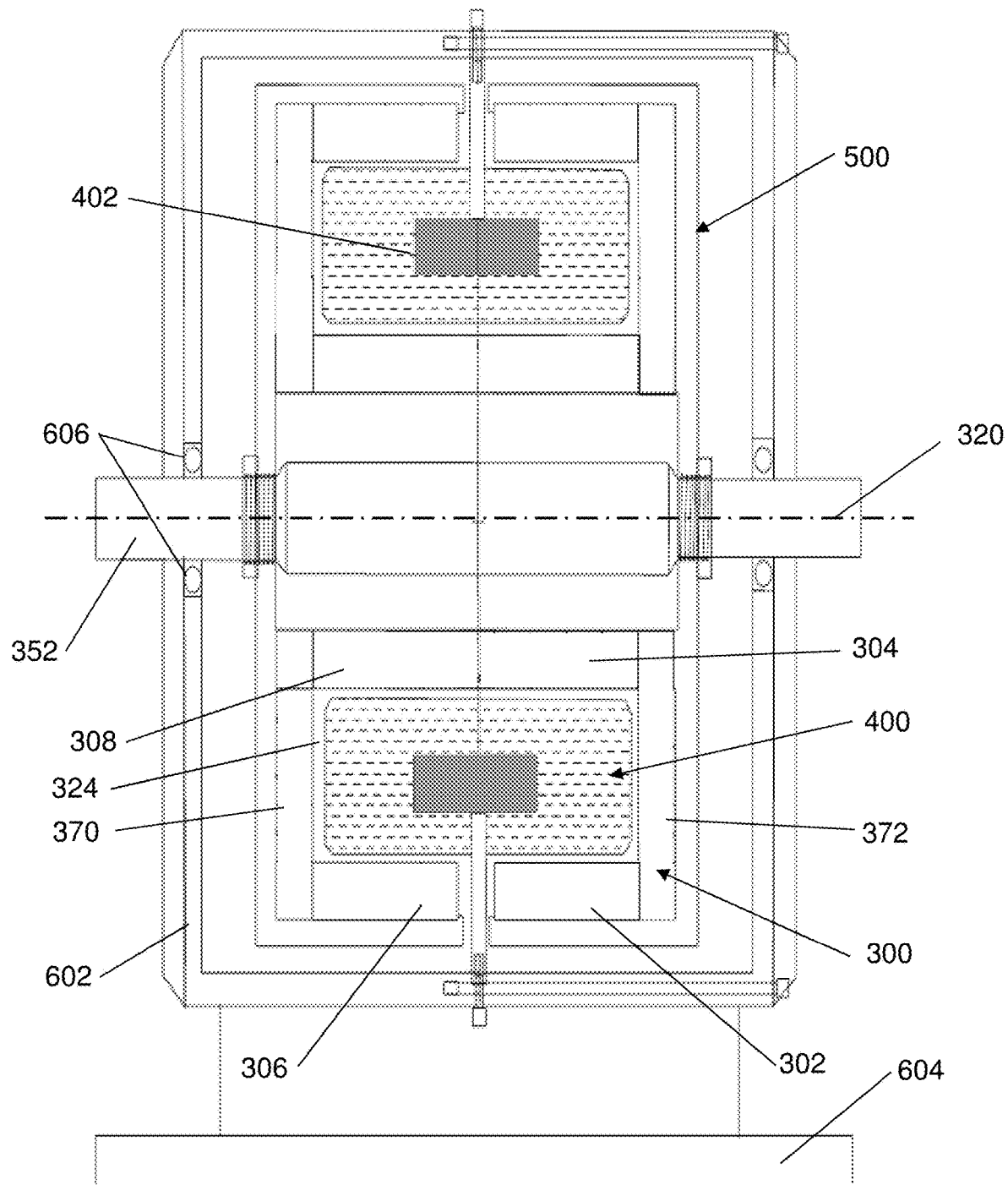
FIGS. 6a and 6b are conceptualized views of a motor/generator.
Figure 6B:
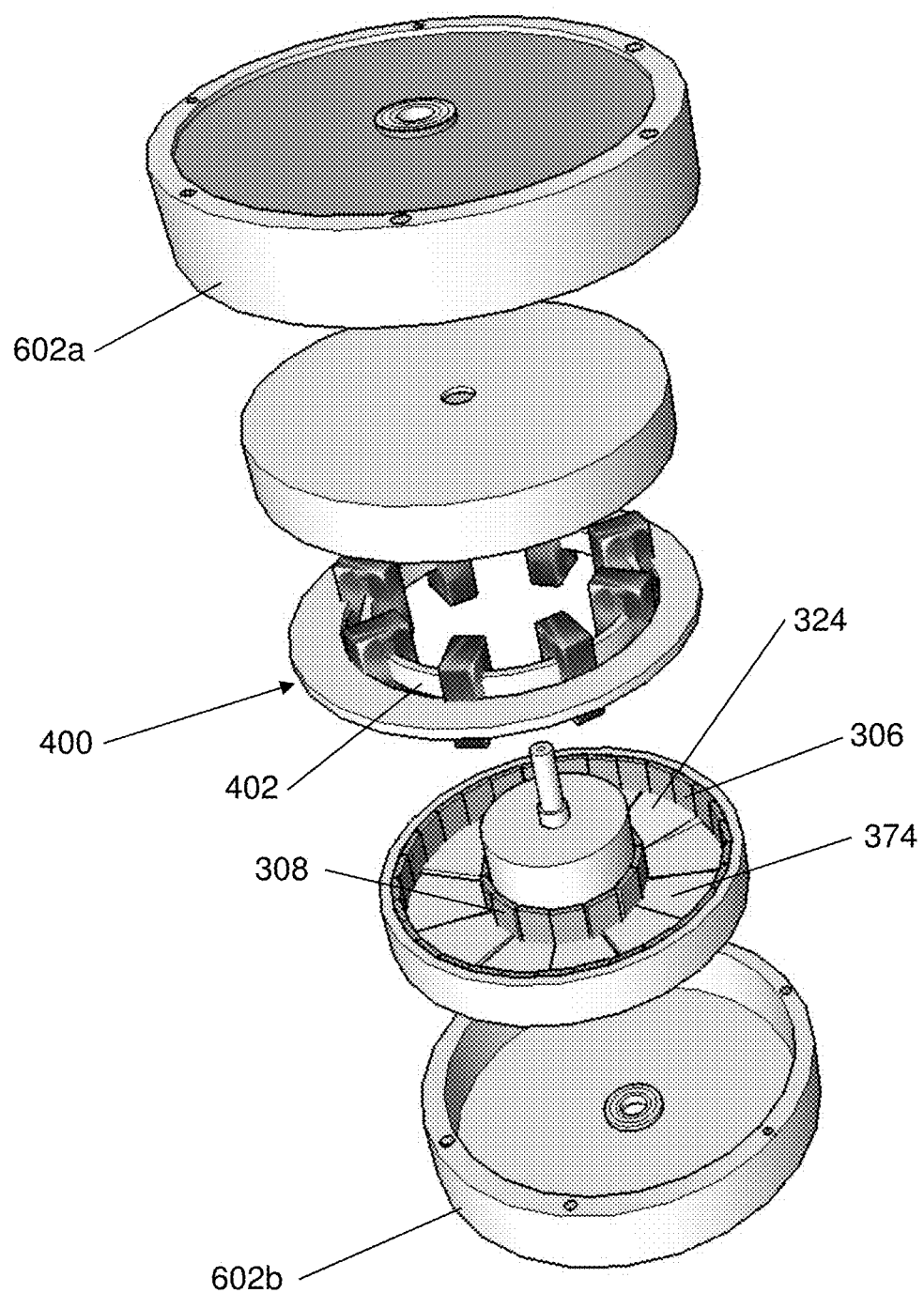

FIG. 6a is a cross section view of the assembly 500 positioned within an assembled motor 600. FIG. 6b is an exploded perspective view of the motor 600. In certain embodiments, there may be an outer casing or housing 602 (or alternatively, two portions of the housing, e.g. housing portion 602a and housing portion 602b) which provides structural support for the rotor 300 and stator 400, and the longitudinal shaft 352. In certain embodiments, the housing 602 may be formed from any material, alloy, or compound having the required structural strength and may be actually made from two housing components. In certain embodiments, non-ferrous materials may be used as there is essentially no detectable external magnetic field from the rotor. In some embodiments, external bearings 606 may be used to reduce the friction between the longitudinal shaft 352 and the housing 602 or a similar supporting structure. In certain embodiments, the housing 602 may be coupled to a base 604 to provide for structural support for the housing 602. As is well known, in the art, the motor 600 may also be coupled to a controller appropriate for the desired output from the machine (not shown).

Operation—Motor Mode:

Turning back to FIG. 4c, electric power is applied to the power terminals (not shown) which energizes the power rail 410 (see FIG. 4c). Current begins to flow in the individual coils in the plurality of coils 406 that are electrically connected to the power rail 410 and sequentially controlled via the plurality of positive switches 418 and negative switches 420. As is well known in the art, when current flows through certain coils 406 a magnetic field is created. When certain coils 406 are within the magnetic field 325 created by the partial toroidal magnetic cylinder 350, the partial toroidal magnetic cylinder 350 and the rotor 300 begins to move relative to the energized coils because of the electromotive forces asserted on the partial toroidal magnetic cylinder 350.

As the rotor 300 and the partial magnetic field 325 rotates about the stator 400 comprising the coils 406, certain coils of the plurality of coils 406 will always be out of the partial toroidal magnetic cylinder 350 portion of the rotor and will be within the throat 315. By adding a second partial toroidal magnetic cylinder 380, it is possible for the coils outside of the partial toroidal magnetic cylinder 350 (i.e., the coils within the throat 315) to also contribute to the overall rotation force or torque on the shaft 352. As the throat 315 moves with respect to the coils, flux is now leaving the interior cavity 324 on its path to the external walls of the partial magnetic cylinder which is in the opposite direction to the flux forces within the partial magnetic cylinder, thus each coil in the throat 315 may be supplied with a reverse polarity via the plurality of switches 416 to contribute torque.

Turning to FIG. 5b which illustrates a section view of the assembled motor 600. FIG. 5b shows a coil 406a which is now within the interior cavity 325 of the partial toroidal magnetic cylinder 350 and a coil 406b which is within the throat 315 (defined by the angular area created by the angel β. From the perspective of a coil, each coil injection point is energized at the proper time so that the coil remains energized only while the coil is within the interior cavity 325 of the partial toroidal magnetic cylinder 350 (e.g. coil 406a) and not energized (or energized with a negative current flow) when the coil (e.g. coil 406b) is within the throat 315.

Voltage is injected via the power terminals of the motor 600 (not shown), thereby causing current to flow along the power rail 410. A positional sensor (not shown), for instance, at the open end 314 of the partial toroidal magnetic cylinder 350 signals a controller (not shown) which in turn activates the appropriate positive switch 418 and the negative switch 420 so that the coils receive a current flow of correct polarity as the coil enters the throat 315 (see FIG. 4c). Thus, a portion of the current from the power rail 410 may travel clockwise from the negative power of the rail through the switch to a coil to the next coil, etc. for the coils that are within the interior cavity 324. The remainder of the current travels counterclockwise from the switch, to a coil to the next coil, etc. for the coils that are within the throat 315.

By way of example, FIG. 5c illustrates a first exemplary position of eight coils (similar to the coils 406 of FIG. 5b) and an exemplary wiring diagram. As illustrated, at the first exemplary position, the 70 degree angle throat 315 is pointed downwards such that coil 8 and coil 1 are in the throat 315. In contrast, the coils 2 through 7 are within the interior cavity or tunnel of the partial toroidal magnetic cylinder 350. A positional sensor alerts a controller as to the position of the toroidal magnetic cylinder 350, which in turn, opens or closes the appropriate switch 418 or 420. For instance, once the appropriate switches are configured, negative current is received at an injection point 424a along the negative rail 414. The current flows through the switch 420a into the junction 416a which splits the current into essentially two circuits in a parallel configuration. The first circuit comprises the coils 1 and 8. The second circuit comprises coils 2 through 7. The current flows between the two circuits in accordance with the relative resistance of both circuits. Thus, a portion of the circuit flows clockwise through coil 1 and coil 8 to the junction 416d, through the positive switch 418a and onto the positive rail 412 of the power rail 410. Similarly, a portion of the current flows counterclockwise through coils 2 through 7 to the junction 416d, through the positive switch 418a and onto the positive rail 412 of the power rail 410 via injection point 422a.

FIG. 5d illustrates a second exemplary position of eight coils and an exemplary wiring diagram. As illustrated, at position two, the 70 degree angle throat 315 has been rotated slightly in a counterclockwise direction such that only coil 1 is in the throat. In contrast, the coils 2 through 8 are within the interior cavity or tunnel of the partial toroidal magnetic cylinder 350. A positional sensor alerts a controller as to the position of the toroidal magnetic cylinder 350, which in turn, opens or closes the appropriate switch 418 or 420. For instance, once the appropriate switches are configured, negative current is received at an injection point 424b along the negative rail 414. The negative current flows through the switch 420b into the junction 416b which splits the current into essentially two circuits in a parallel configuration. The first circuit comprises the coil 1. The second circuit comprises coils 2 through 8. The current flows between the two circuits in accordance with the relative resistance of both circuits. Thus, a portion of the current flows clockwise through coil 1 to the junction 416e, through the positive switch 418b and onto the positive rail 412 of the power rail 410. Similarly, a portion of the current flows counterclockwise through coils 2 through 8 to the junction 416e, through the positive switch 418b and onto the positive rail 412 of the power rail 410 via injection point 422b.

FIG. 5e illustrates a third exemplary position of eight coils and an exemplary wiring diagram. As illustrated, at position three, the 70 degree angle throat 315 has been rotated slightly in a counterclockwise direction such that coil 1 and coil 2 are in the throat. In contrast, the coils 3 through 8 are within the interior cavity or tunnel of the partial toroidal magnetic cylinder 350. A positional sensor alerts a controller as to the position of the toroidal magnetic cylinder 350, which in turn, opens or closes the appropriate switch 418c or 420c. For instance, once the appropriate switches are configured, negative current is received at a negative injection point 424c along the negative rail 414. The negative current flows through the negative switch 420c into the junction 416c which splits the current into essentially two circuits in a parallel configuration. The first circuit comprises the coils 1 and 2. The second circuit comprises coils 3 through 8. The current flows between the two circuits in accordance with the relative resistance of both circuits. Thus, a portion of the current flows clockwise through coils 1 and 2 to the junction 416f, through the positive switch 418c and onto the positive rail 412 of the power rail 410. Similarly, a portion of the current flows counterclockwise through coils 3 through 8 to the junction 416f, through the positive switch 418c and onto the positive rail 412 of the power rail 410 via injection point 422c.

This cycle of switching and forming two new parallel circuits repeats as the rotor rotates around the stator and new coils are included in the throat as described above.

Reversal of rotor rotation is a logic sequence of switch activation in reverse of previously stated switching sequences, as opposed to a brushed unit where reversal is best accomplished by reverse polarity at the power injection brushes.

For instance turning back to FIG. 5b, the coil 406b is now positioned in the throat 315 as the partial toroidal cylinder 350 rotates around the longitudinal shaft 352. The partial toroidal cylinder 350 will soon rotate such that the coil 406b will be in the interior cavity 324 as the open end 314 of the partial toroidal cylinder 350 engulfs the coil. Likewise, a portion of the established static magnetic field 325 is rotating so that it will engulf the coil 406b. As described above, the coil 406b receives a current within the windings of the coil from the power rail 410. As the current flows in the windings, a magnetic field is formed around the windings. This magnetic field of the coil 406b interacts with the first portion of the magnetic field 325 as the coil is engulfed by the open end 314 which causes an electromotive force on the partial toroidal cylinder 350 and the rotor 300. In turn, the electro-motive force on the partial toroidal cylinder 350 transfers to the rotor hub 368. The rotation force on the rotor hub 368 is then applied to the longitudinal shaft 352—causing the shaft to rotate.

As the partial toroidal magnetic cylinder 350 continues to rotate, the interior cavity 324 and the flux field therein continues to surround and pass the coil 406b. When the partial toroidal cylinder 350 rotates completely around the coil 406b such that the open end 316 passes the coil, the current at the coil is then reversed by the appropriate sensor and switches. This current reversal causes a continuation of the previous movement and direction of the partial toroidal cylinder 350 with respect to the coil 406b and continues while the coil 406b is now within the throat 315. This rotational cycle then repeats as the partial toroidal cylinder 350 continues to rotate about the longitudinal axis 320.

Operation—Generator Mode:

In the generator mode, when the partial toroidal cylinder 350 engulfs a portion of the plurality of coils 406 as the partial toroidal cylinder 350 rotates as the shaft 352 is being rotated, the coils within the partial toroidal magnetic cylinder only see the "flux walls" (as discussed in reference to FIG. 2b). They may not be affected by the direction of flux within the core, thus the coils produce power while the partial toroidal magnetic cylinder 350 travels around them. However during the period of time the coils are in the throat 315, it is possible that the coils can also contribute to the power being produced. During this transition period when the coils 406 are in the throat 315, the flux is now leaving the iron core 332 on its path to the external walls 302, 304, 370 and 372 of the partial toroidal magnetic cylinder 350 which is, however in the opposite direction to the flux forces within the partial toroidal magnetic cylinder. Thus, the coil 406 can also produce usable power even in the throat 315 which can be utilized depending on design needs.

As discussed above, the shaft 352 receives a rotational force from an external rotational force inducing mechanism known in the art (not shown). In response to this rotational force, the shaft begins to rotate. As the rotor hub 368 is coupled to the shaft 352, the rotor hub also begins to rotate which in turn rotates the rotor 300. As discussed above, the rotor 300 is coupled to the partial toroidal magnetic cylinder 350 radially positioned around a portion of its periphery and a throat 315 positioned around the remaining portion of its periphery. From the perspective of coils, the coil 406b is within the throat until the partial toroidal magnetic cylinder 350 rotates around and engulfs the coil.

As the open end 114 begins to engulf the coil 406b, the first portion of magnetic field 325 having concentrated magnetic flux as discussed above also surrounds the coil. The rotational movement of the magnetic field 325 with respect to the coil 406a within the concentrated flux field 325 induces a voltage to appear in the terminal ends of the coil. This voltage generated is added to the voltage generated by the remainder of the coils. The voltage causes current to flow through the switches and on to the power rail 410. As the magnetic cylinder throat rotates the appropriate switches are sequentially operated to allow current to flow to the power rail. The power rail 410 is coupled to an external closed circuit (not shown) via the power terminals (not shown).

The continuous movement of the concentrated flux field 325 with respect to the coil 406b continues to induce a voltage to appear in the terminal ends of the coil as the concentrated flux field moves around the coil. The continuous voltage causes a continuous current to flow through the switches and then to the power rail 410 which is electrically coupled to an external closed circuit via the power terminals (not shown).

The continued movement of the partial toroidal magnetic cylinder 350 causes the open end 314 (and the magnetic filed 325) to rotate past the coil 406b. Thus, the coil 406b is now within the throat 315. The movement of the throat 315 engulfing the coil 406 causes a voltage of an opposite polarity to be induced into the coil 406b and appears in the terminal ends of the coil causing current in the windings of the coil to flow in a reverse direction.

The continuous movement of the throat 315 past the coil 406b within the second portion of the concentrated flux field continues to induce a voltage to appear in the terminal ends of the coil. The continuous voltage causing continuous current to flow while the coil is in the throat 315 which in turn flows through the switches 416 to the power rail 410 which is coupled to an external closed circuit via the power terminals.

However, the output voltage from the power rail 410 does not change polarity at any point due to the effect of the positional sensor, controller, and switches 416. Thus, the output is DC.

This rotational cycle then repeats as the partial toroidal magnetic cylinder 350 continues to rotate about the longitudinal axis 320.

Figure 7A:
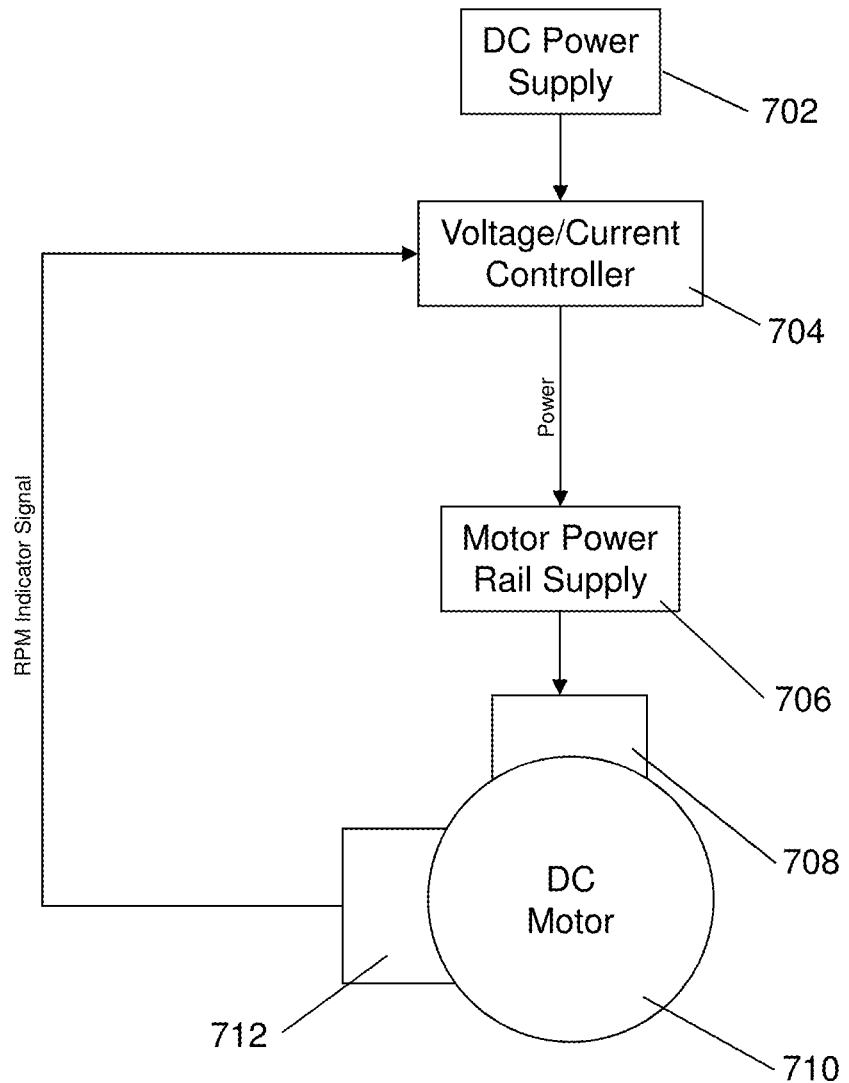
FIG. 7a is a communication flow diagram of various exemplary control components of the motor/generator which may be used in various aspects of the disclosed invention.

FIG. 7a is a communication flow diagram of various exemplary control components of the motor/generator. For example, a voltage/current controller 704 may receive power from an electric power source 702. The voltage/current controller 704 may limit and control the power sent on to motor power rail supply 706 (e.g., the power rail 410 of FIG. 4). A throat position logic and power injection point switching module 708 uses sensor feedback to control which switches are closed in the motor 710 as discussed in reference to FIGS. 5c through 5d above. In certain embodiments when speed or torque control is required, a "revolutions per minute" or RPM encoder 712 tracks the speed of the rotation and sends RPM indication signals back to the voltage/current controller 704, which in turn adjusts the power sent to the power rail to either increase or decrease the RPM depending on the parameters programmed or set in the voltage/current controller 704.

Figure 7B:
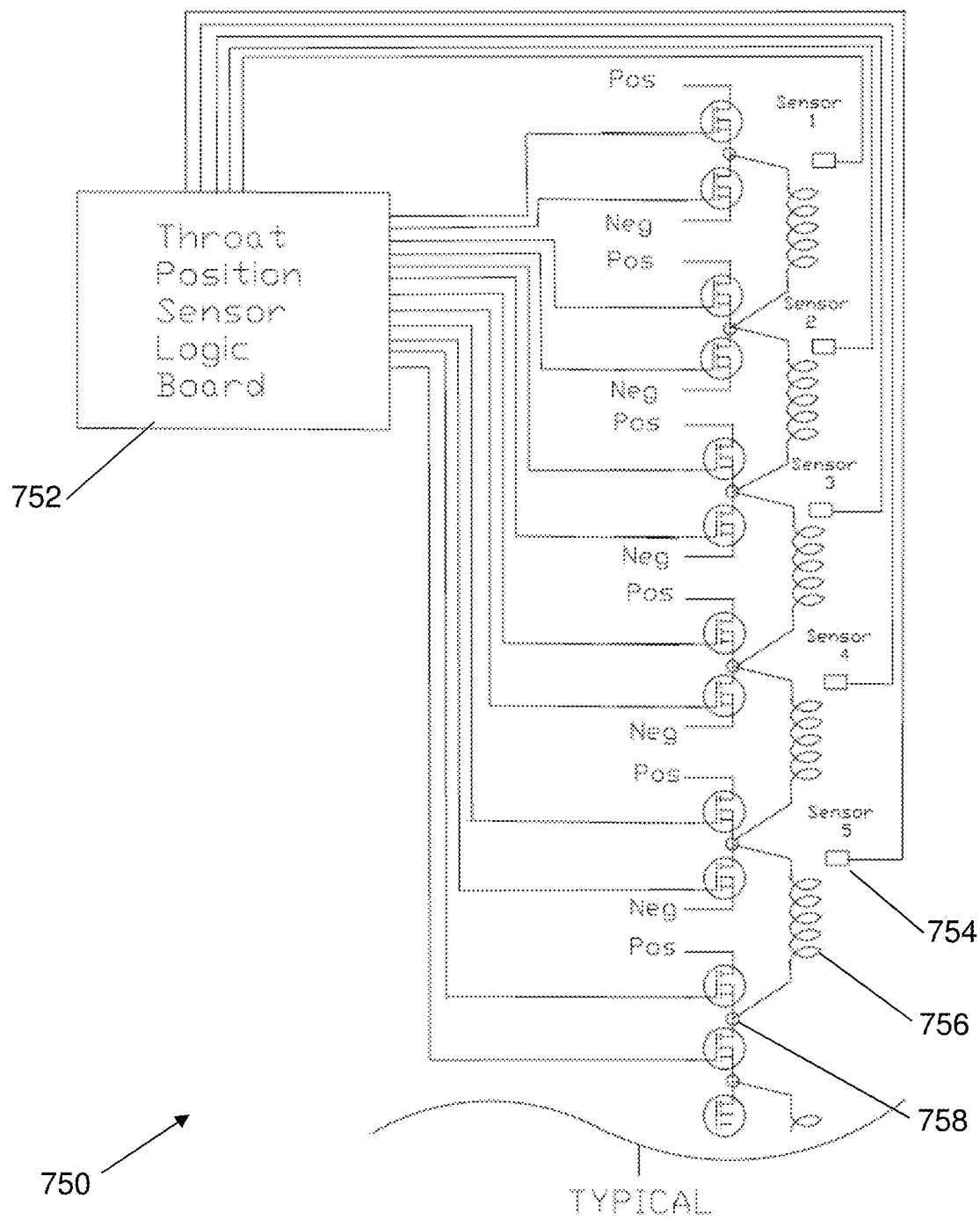
FIG. 7b is a diagram of a sensor and switching control circuit which may be used in various aspects of the present invention.

FIG. 7b is a circuit diagram of one embodiment of an exemplary sensor and switching control circuit 750 such as the sensor and switching control circuit 708 of FIG. 7a. In this embodiment, there is a controller or throat position sensor logic board 752 which receives signals from a plurality of sensors 754 (labeled as sensors 1 through 5 in FIG. 7b). The plurality of sensors 754 are positioned about individual coils of a plurality of coils 756 making up a coil assembly, for instance the coil assembly 408 (See FIG. 4a). The plurality of sensors 754 determine the rotational position of the rotor or rotor assembly with respect to the stator (and the plurality of coils 756). In this exemplary embodiment, the switching sequence merely follows the movement of the rotor and does not control torque or speed. As discussed above, each coil in the plurality of coils 756 is also connected to a plurality of junction points 758 (i.e., junction points 416 of FIG. 4c). The junction points 758 are connected to a plurality of positive and negative switches 780 (i.e., positive switches 418 and negative switches 420 of FIG. 4c). In this embodiment, the plurality of positive and negative switches may be a plurality of MOSFET transistors 760.

Referring also to FIGS. 5c through 5e, the control circuit 750 may be activated in the following sequence: As the throat 315 moves to surround Coil 1, position sensor 1 is activated, a signal is sent to the Throat Position Sensor Logic Board 752. A MOSFET gate driver is then activated to close the appropriate positive MOSFET for the sensor 1 coil 1 position and to the appropriate negative MOSFET coil 1 and coil 2 negative junction. In FIG. 5c, this action would then allow current to travel to Coil 1 via a positive Mosfet and Coil 1 via coil 2 Negative Mosfet. Correspondingly, current will also flow through coils 2 through 7 via the positive Mosfet (e.g., Junction 416a) and a Negative Mosfet (e.g. Junction 416d). Sensor 1 will stay activated during the duration coil 1 is in the throat. As the throat moves to surround Coil 2, sensor 2 is activated. This Input from sensor 2 and the input from active sensor 1 deactivates Coil 1-coil 2 Negative Mosfet and sends a signal to the gate on Coil 2 and coil 3 negative Mosfet. Both Coils 1 and 2 now have current of the same polarity flowing though them (FIG. 5e). As the throat moves to surround Coil 3 sensor 1 is no longer active which deactivates Coil 1 positive mosfet. And sensor 3 now activates Coil 1 and coil 2 junction Positive Mosfet. This action would the allow current to travel to Coil 2 positive Mosfet and Coil 2-coil 3 Negative Mosfet. Correspondingly, current will also flow through coils 3 through 8 via a positive Mosfet (e.g., Junction 416f) and a Negative Mosfet (e.g., Junction 416c). The sequence then repeats as the rotor moves from sensor to sensor.

Figure 8A:
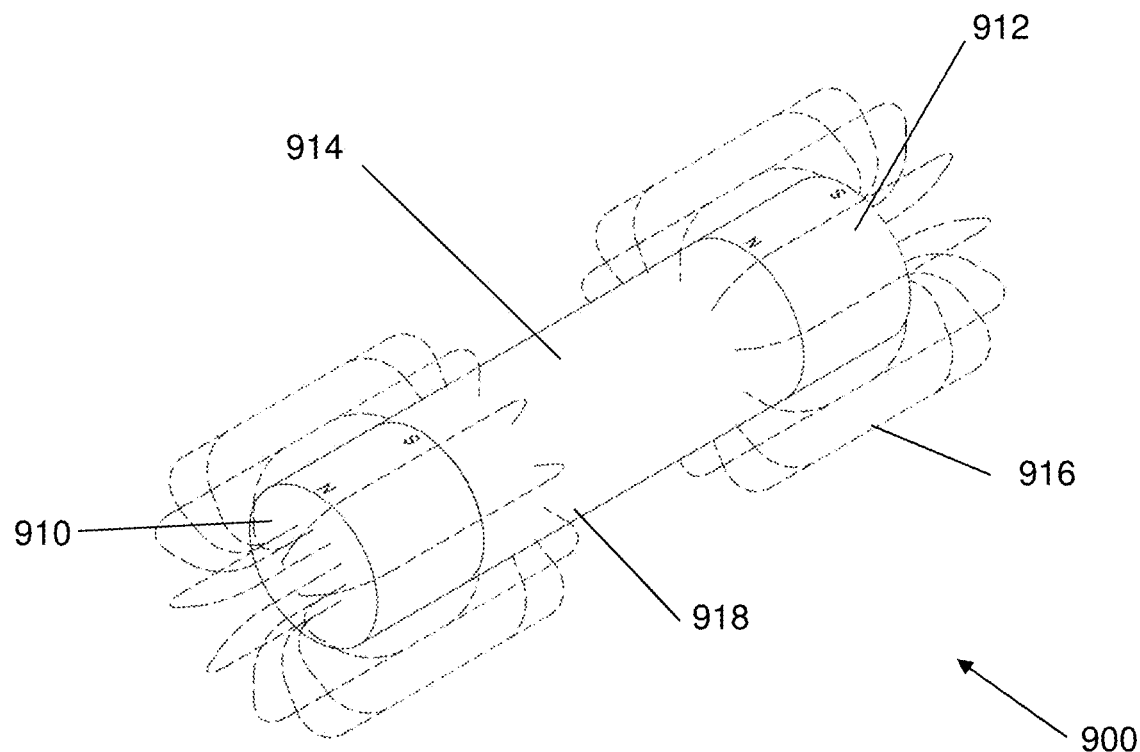
FIG. 8a is an isometric view of a flux or magnetic field concentrator which could be used with various embodiments disclosed herein.

FIG. 8a illustrates conceptual flux lines 916 of a hybrid magnet assembly 900. Conceptually similar embodiments to the hybrid magnet assembly 900 might be used with various embodiments disclosed above. One skilled in the art may see that though some of the aligned magnetic domains will contribute to flux lines 916 exiting the permanent magnets pole faces, however, most will "leak" out of the core side walls 918.

Figure 8B:
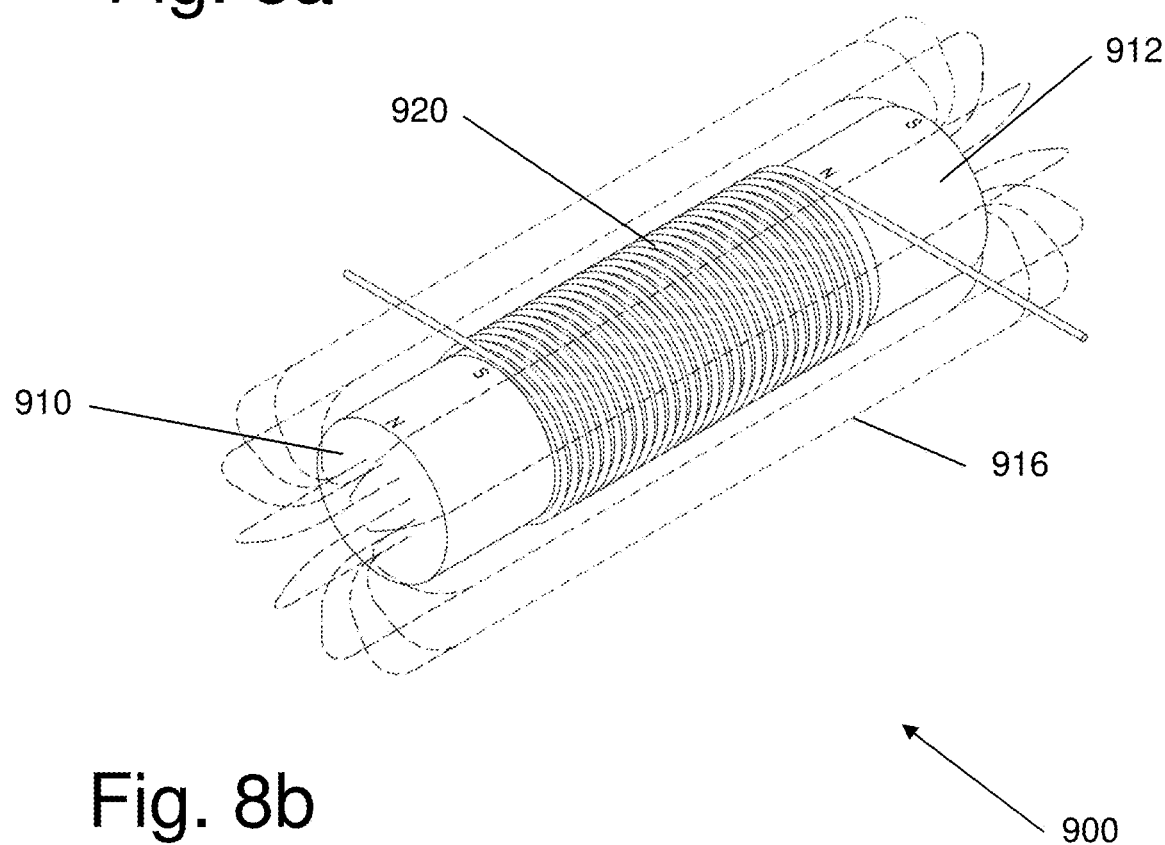
FIG. 8b is an isometric view of an improved flux or magnetic field concentrator which could be used with various embodiments disclosed herein.

FIG. 8b illustrates the hybrid magnet assembly 900 with a spirally wrapped a conductive material 920 carrying a current. Conceptually similar hybrid magnet assemblies with conductive material may be used with the various disclosed embodiments above to overcome the disadvantages of using the hybrid magnet assembly 900. As illustrated, the conductor 920 confines and concentrates the flux lines 916 to align any magnetic domains not aligned by the permanent magnets. This addition allows the creation of much stronger magnetic flux outputs at a lower ampere turn levels than conventional iron core coils.

Thus, such "hybrid" magnet assemblies can also be used to assist in the concentration of flux force lines in the partial magnetic cylinders discussed above.

Advantages of Certain Embodiments

Disclosed above are methods and systems of increasing flux density utilizing commercially available shapes or sizes that can be chosen based on lower cost rather than flux density. Also described are methods of producing mechanical power by moving a coil/s coupled to a core into a magnet assembly with an increased flux density or producing an electrical output power when the coils are mechanically forced through the magnetic assembly with an increased flux density. In certain aspects, within the magnetic cylinder or magnet assembly magnetic flux lines are created and increased by the configuration of permanent magnets or electromagnets and are restrained within the magnetic cylinder or magnet assembly until exiting at predetermined locations.

In certain aspects presented herein, non-pulsating or non-sinusoidal DC current is applied to the power terminals which produces a Lorentz force at each length of coil conductor. This force is applied continuously throughout the entire rotation of the rotor hub without variations in amplitude or interruptions in output power. There are no pole pieces to provide magnetic attraction or repulsion consequently, there is reduced torque ripple, polarity reversals or interruptions in power output while the poles are in the process of reversing, thus producing more efficient output than traditional motors When certain aspects of the disclosed embodiments are used as a generator non pulsating or non-sinusoidal DC current is produced at the power terminals. A Lorentz force at each length of coil conductor and across all coils induces an output current flow. This output is supplied continuously throughout the entire rotation of the rotor hub without variations in amplitude, polarity reversals, or interruptions in output power. There are no pole pieces to provide magnetic attraction or repulsion which produces a current output more efficiently than traditional generators.

Certain aspects of the disclosed embodiments reduce or eliminate the undesired effects and losses of traditional generators and motors discussed above, including Iron Hystersis losses, Counter-EMF, inductive kickback, eddy currents, inrush currents, torque ripple, heat losses, cogging, brush losses, sparking and high wear in brushed designs, commutation losses and magnetic buffeting of permanent magnets.

In summary, certain aspects of the various disclosed embodiments may provide the following benefits:

Unlike conventional brush rectified or PWM controller motor/generators, the coils in aspects of this invention are in continuous contact with the Permanent Magnet field and thus produce a non-varying continuous torque or output.

Complex PWM drives and controllers, commutators, etc (and the associated losses) may not be not required since certain aspects of the invention produce and utilize DC current directly.

If automatic speed control for a given load is required, complex position indication is not required. A much simpler RPM indication and a varying voltage/current relationship is all that is required to control speed.

Using the magnetic cylinder/single pole magnet assembly concept utilizing permanent magnets an otherwise unachievable, extremely strong magnetic field is generated without consuming any electrical power.

Though a Counter EMF field is produced by any induced current flow, due to the magnet cylinder and core design there is no direct impact on coil movement that hinders such movement.

Iron Hysteresis losses are essentially eliminated as only two points on the core experience any hysteresis loss at all and then only twice per revolution.

Eddy current losses are essentially eliminated as the core does not move perpendicular to the flux lines Cogging is also essentially eliminated as the core forces are balanced and equal in all directions There is little inrush current as there is no need to saturate large masses of iron Nearly 100% of the copper windings in the coil is utilized to take advantage of Lorentz forces thus there is no wasted copper winding as in conventional motor/generators.

Inductive kickback from the rising and collapsing sinusoidal waveform is eliminated Like other DC motors reversal of torque is simply a reversal of input polarities.

Additionally, as every coil is continuously involved in output power, and with differing switching combinations other important benefits can be realized that are not possible with existing motor designs. e.g. certain aspects of the various disclosed embodiments may provide the following benefits:

Coils may be recombined on the fly in varying series and parallel connections to enable changes in system current flow and thus output torque without changes in voltage, Bypass faulted, shorted or open coils on the fly allowing emergency and continued operation of the motor or generator outputs, Allow regenerative braking by utilizing one or more coils to be connected to an external load, Apply active braking by utilizing one or more coils to apply an opposing force with application of power to select coils, Allow fine control of shaft positioning by utilizing one or more coils to offset applied torque, Reverse operation as a motor may be accomplished by reversing main power supply polarity or reversing logic switch sequence.

In other embodiments each coil's output is individually rectified before being sent to the power rails.

The invention claimed is:

1. A control system for a generator/motor, comprising:
   a controller coupled to a power rail supply, wherein the power rail supply is configured to energize a positive power rail and a negative power rail that provide positive power and negative power, respectively, to a generator/motor;
   a plurality of sensors coupled to the controller, wherein each of the plurality of sensors is positioned to detect a rotational position of at least one of a plurality of coils of the generator/motor relative to a stator of the generator/motor, wherein the motor includes
      a rotor having a partial toroidal magnetic cylinder positioned within a housing, wherein substantially all interior surfaces of the partial toroidal magnetic cylinder have a corresponding magnetic pole of a first polarity that points towards a sectional center of the partial toroidal magnetic cylinder to generate flux forces within the partial toroidal magnetic cylinder, and wherein a throat is defined between an entrance and an exit of the partial toroidal magnetic cylinder;
      a center shaft positioned along the longitudinal axis and coupled to the toroidal partial magnetic cylinder; and
      a stator having a support ring coupled to the housing, the plurality of coils coupled to the support ring and positioned radially about the longitudinal axis and sized to allow the partial toroidal magnetically closed cylinder to rotate about the plurality of coils, and a plurality of magnets fixedly coupled to the support ring and having a polarity orientated to redirect flux forces back into the partial toroidal magnetically closed cylinder; and
   a plurality of positive switches coupled to the positive power rail and a plurality of negative switches coupled to the negative power rail, wherein the positive switches and negative switches are further coupled to the coils,
   wherein the controller is configured to execute a switching sequence by receiving input signals from at least a portion of the sensors and controlling a state of each of the positive and negative switches based on the received sensor information in order to energize the coils based on each coil's rotational position relative to the throat.

2. The control system of claim 1 wherein the switching sequence follows rotation of the rotor and does not control either torque or speed of the generator/motor.

3. The control system of claim 1 further comprising a rotations per minute (RPM) encoder configured to track a rotational speed of the rotor relative to the stator and send an RPM indication signal to the controller.

4. The control system of claim 3 wherein the controller is further configured to use one or more parameters available to the controller to adjust an amount of power provided by the power rail supply to at least one of the positive power rail and the negative power rail based on the RPM indication signal in order to either increase or decrease the rotational speed.

5. The control system of claim 1 wherein the controller is configured to energize the coils in a sequential manner.

6. The control system of claim 1 wherein the controller is configured to energize the coils in groups, wherein all coils within a group are energized simultaneously using a positive current or a negative current.

7. The control system of claim 1 wherein, during rotation, the controller is configured to apply a first current to all coils within the throat and apply a second current that is opposite the first current to all coils not within the throat.

8. The control system of claim 7 further comprising an electrical junction positioned between each of the plurality of coils, wherein the coils are connected in series via the junctions, and wherein each electrical junction couples two of the coils and is coupled to the positive power rail via one of the positive switches and to the negative power rail via one of the negative switches, and wherein the controller is configured to control the first and second currents for all of the coils by closing a single positive switch and a single negative switch, and by opening the remainder of the positive switches and the negative switches.

9. The control system of claim 8 wherein the closed single positive switch and the closed single negative switch are located within or proximate to the throat.

10. A control system for a generator/motor, comprising:
    a logic circuit configured to energize a plurality of coils of a motor/generator as the coils rotate relative to a throat of a partial toroidal magnetic cylinder of the motor/generator, wherein the partial toroidal magnetic cylinder has substantially all interior surfaces with a corresponding magnetic pole pointing towards a sectional center of the partial toroidal magnetic cylinder to generate flux forces within the partial toroidal magnetic cylinder, and wherein the throat is defined between an entrance and an exit of the partial toroidal magnetic cylinder;
    a plurality of junctions, wherein each junction is coupled to two of the coils, and is further coupled to a positive power rail via a positive switch and to a negative power rail via a negative switch, wherein the plurality of coils are electrically connected in series via the junctions; and
    a plurality of sensors coupled to the controller, wherein each of the plurality of sensors is positioned to detect a rotational position of at least one of a plurality of coils of the generator/motor relative to the throat,
    wherein the controller is configured to execute a switching sequence by receiving an input signal from at least one of the sensors and controlling a state of each of the positive and negative switches based on the input signal in order to energize the coils based on each coil's rotational position relative to the throat.

11. The control system of claim 10 wherein the switching sequence follows rotation of the coils relative to the throat and does not control either torque or speed of the generator/motor.

12. The control system of claim 10 further comprising a rotations per minute (RPM) encoder configured to track a rotational speed of the coils relative to the throat and send an RPM indication signal to the controller.

13. The control system of claim 12 wherein the controller is further configured to use one or more parameters available to the controller to adjust an amount of power provided by a power rail supply to at least one of the positive power rail and the negative power rail based on the RPM indication signal in order to either increase or decrease the rotational speed.

14. The control system of claim 10 wherein the controller is configured to energize the coils in a sequential manner.

15. The control system of claim 10 wherein the controller is configured to energize the coils in groups, wherein all coils within a group are energized simultaneously using a positive current or a negative current.

16. The control system of claim 10 wherein, during rotation, the controller is configured to apply a first current to all coils within the throat and apply a second current that is opposite the first current to all coils not within the throat.

17. The control system of claim 16 wherein the controller is configured to control the first and second currents for all of the coils by closing a single positive switch and a single negative switch, and by opening the remainder of the positive switches and the negative switches.

18. The control system of claim 17 wherein the closed single positive switch and the closed single negative switch are located within or proximate to the throat.

19. A method for controlling a generator/motor, comprising:
receiving, by a controller, at least one input signal from a sensor, wherein the sensor is configured to indicate a position of one of a plurality of coils of a generator/motor as the coil rotates relative to a throat of a partial toroidal magnetic cylinder of the generator/motor, wherein the partial toroidal magnetic cylinder has substantially all interior surfaces with a corresponding magnetic pole pointing towards a sectional center of the partial toroidal magnetic cylinder to generate flux forces within the partial toroidal magnetic cylinder, and wherein the throat is defined between an entrance and an exit of the partial toroidal magnetic cylinder;
executing, by the controller, a switching sequence based on the input signal by actuating at least a first positive switch of a plurality of positive switches and a first negative switch of a plurality of negative switches, wherein the plurality of positive and negative switches control a supply of positive and negative current, respectively, to the plurality of coils, wherein the actuating applies a first current to all coils within the throat and applies a second current that is opposite the first current to all coils not within the throat.

20. The method of claim 19 further comprising:
receiving, by the controller, a rotational speed of the coils relative to the throat from a rotations per minute (RPM) encoder; and
using one or more parameters available to the controller to adjust an amount of power provided by a power rail supply to at least one of the positive power rail and the negative power rail based on the rotational speed in order to either increase or decrease the rotational speed.

* * * * *